(12) United States Patent
Truax et al.

(10) Patent No.: US 9,769,975 B2
(45) Date of Patent: Sep. 26, 2017

(54) VERSATILE NO-TILL SEED PLANTER

(71) Applicant: Truax Company Inc., New Hope, MN (US)

(72) Inventors: James Truax, Crystal, MN (US); Ben Zoubek, Andover, MN (US)

( * ) Notice: Subject to any disclaimer, the term of this patent is extended or adjusted under 35 U.S.C. 154(b) by 74 days.

(21) Appl. No.: 15/077,512

(22) Filed: Mar. 22, 2016

(65) Prior Publication Data

US 2016/0255761 A1 Sep. 8, 2016

Related U.S. Application Data

(62) Division of application No. 13/428,986, filed on Mar. 23, 2012, now Pat. No. 9,313,940.

(51) Int. Cl.
| | |
|---|---|
| *A01C 7/00* | (2006.01) |
| *A01C 7/20* | (2006.01) |
| *A01C 5/06* | (2006.01) |
| *A01B 63/28* | (2006.01) |
| *A01C 7/08* | (2006.01) |

(52) U.S. Cl.
CPC .......... *A01B 63/28* (2013.01); *A01C 5/06* (2013.01); *A01C 5/064* (2013.01); *A01C 7/006* (2013.01); *A01C 7/08* (2013.01); *A01C 7/203* (2013.01); *A01C 7/208* (2013.01); *Y02P 60/16* (2015.11); *Y02P 60/23* (2015.11)

(58) Field of Classification Search
CPC combination set(s) only.
See application file for complete search history.

(56) References Cited

U.S. PATENT DOCUMENTS

| | | | | |
|---|---|---|---|---|
| 4,977,841 A * | 12/1990 | Truax | ................ | A01B 49/06 111/164 |
| 6,454,019 B1 * | 9/2002 | Prairie | ................ | A01B 63/145 111/163 |
| 6,752,094 B1 * | 6/2004 | Truax | ................ | A01B 49/06 111/135 |
| 7,387,077 B1 * | 6/2008 | Truax | ................ | A01C 7/205 111/135 |

* cited by examiner

*Primary Examiner* — Alicia Torres

(57) ABSTRACT

A seed planter comprises a frame including a main frame section and a furrowing disk frame section. A plurality of planter assemblies may be connected to the main frame section, and a plurality of furrowing disks may be connected to the furrowing disk frame section. At least one linkage may connect the main frame section and the furrowing disk frame section, and at least one motor may be configured to move the furrowing disk frame section with respect to the main frame section, wherein the at least one linkage permits the furrowing disk frame section to move to a low position for no-till planting and move to a high position for prepared seed beds or conventional planting.

20 Claims, 31 Drawing Sheets

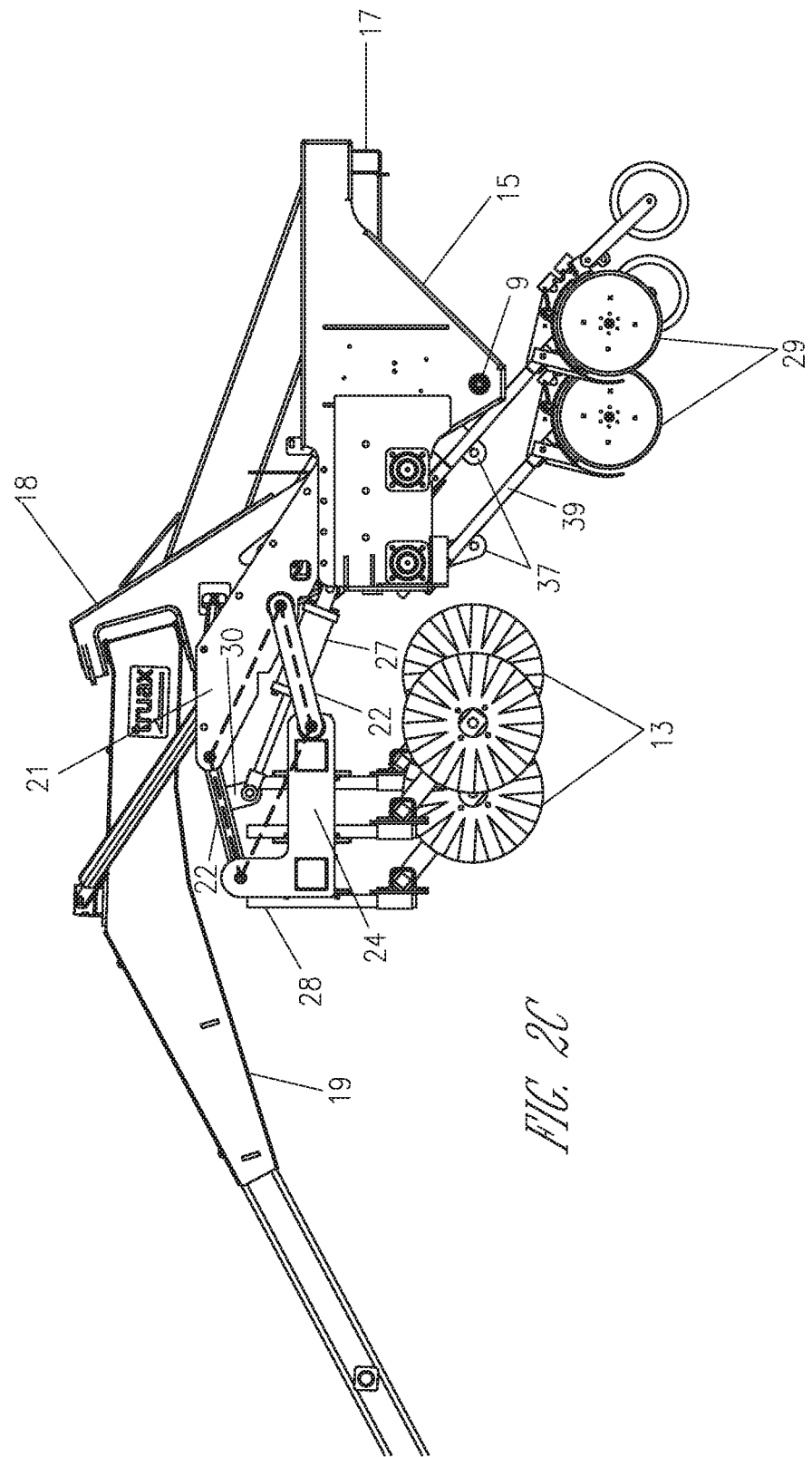

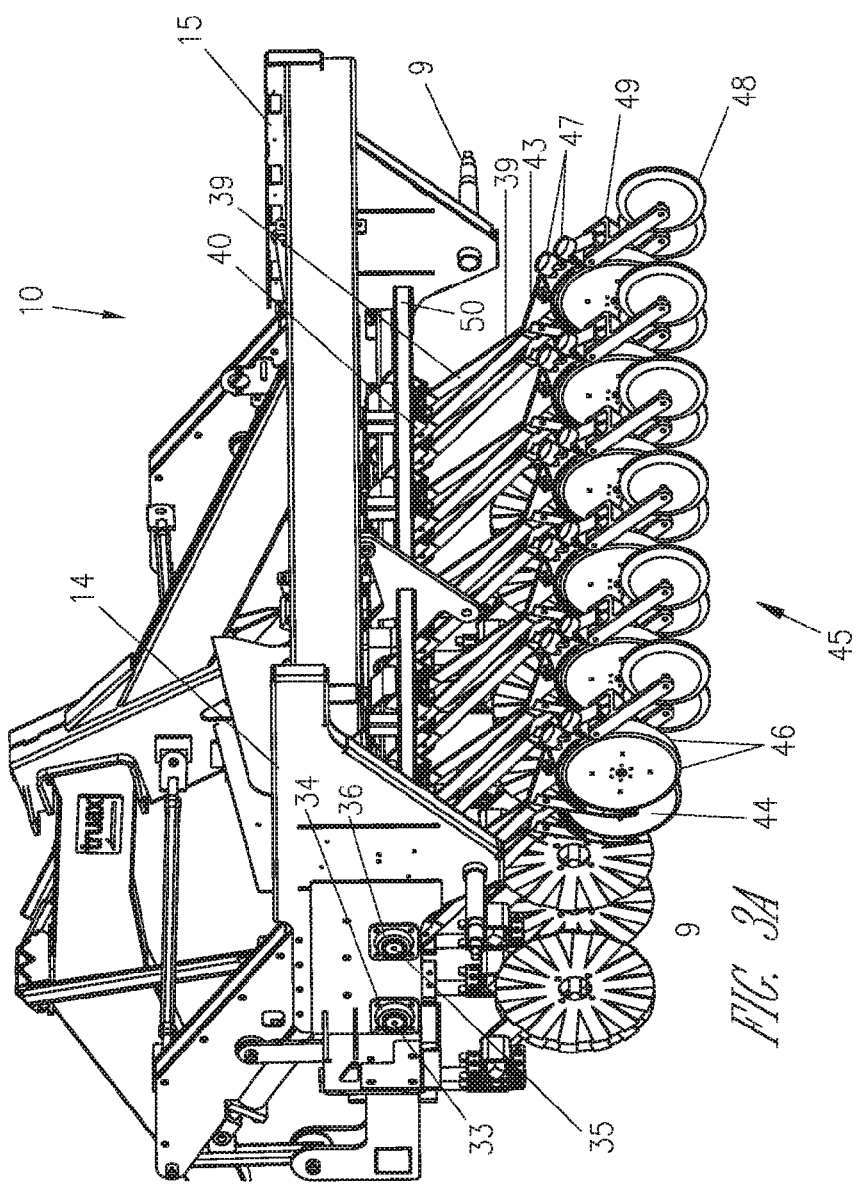

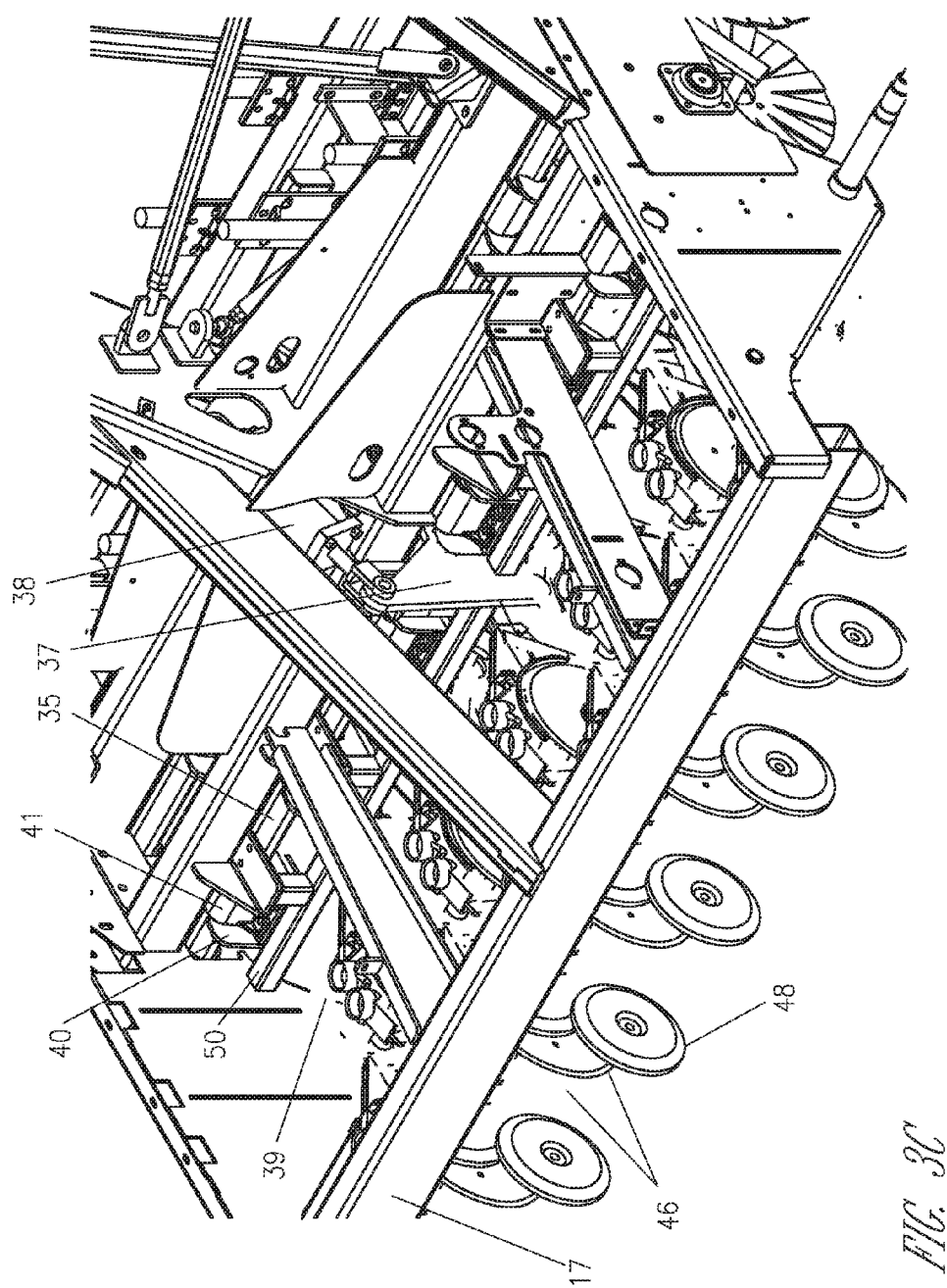

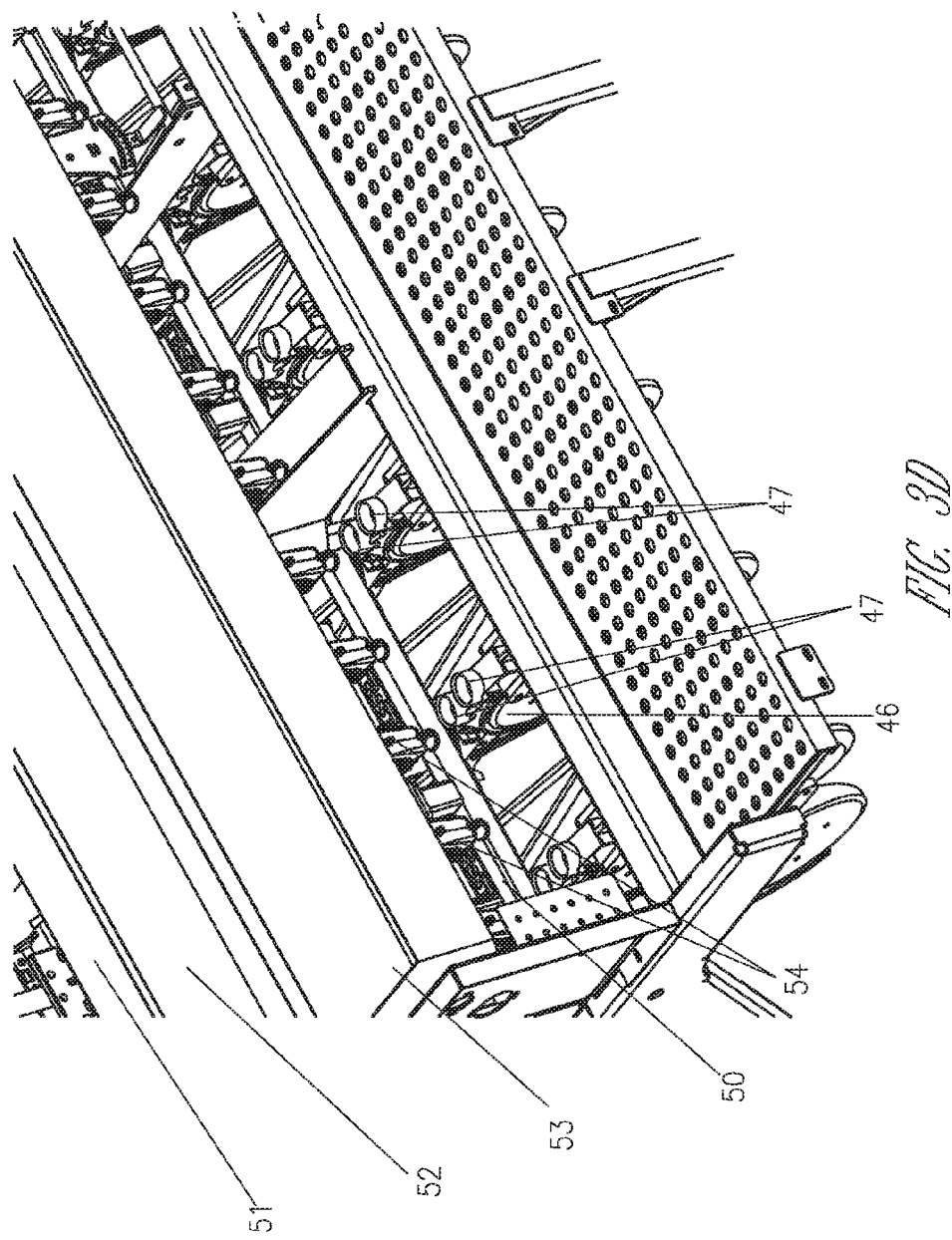

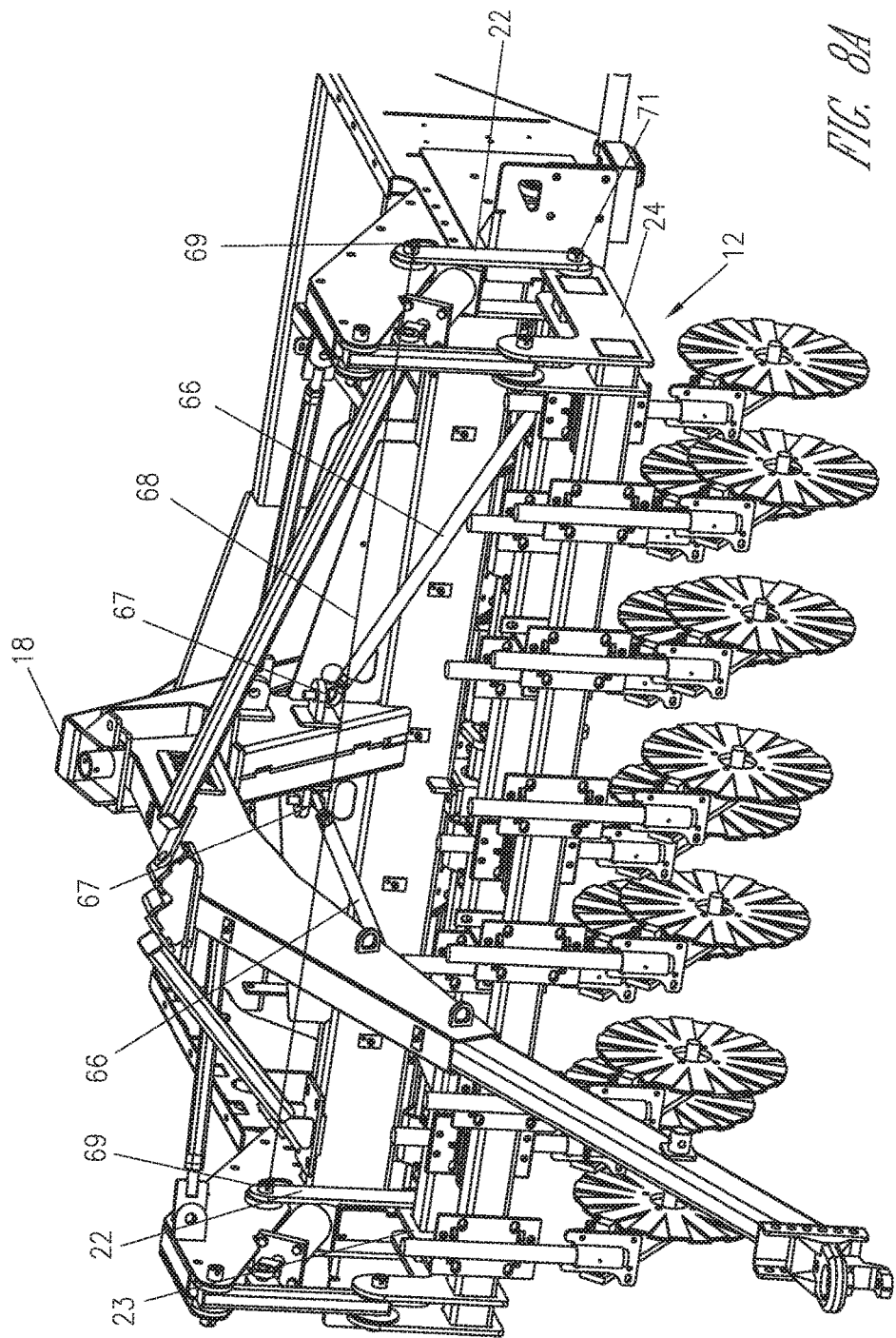

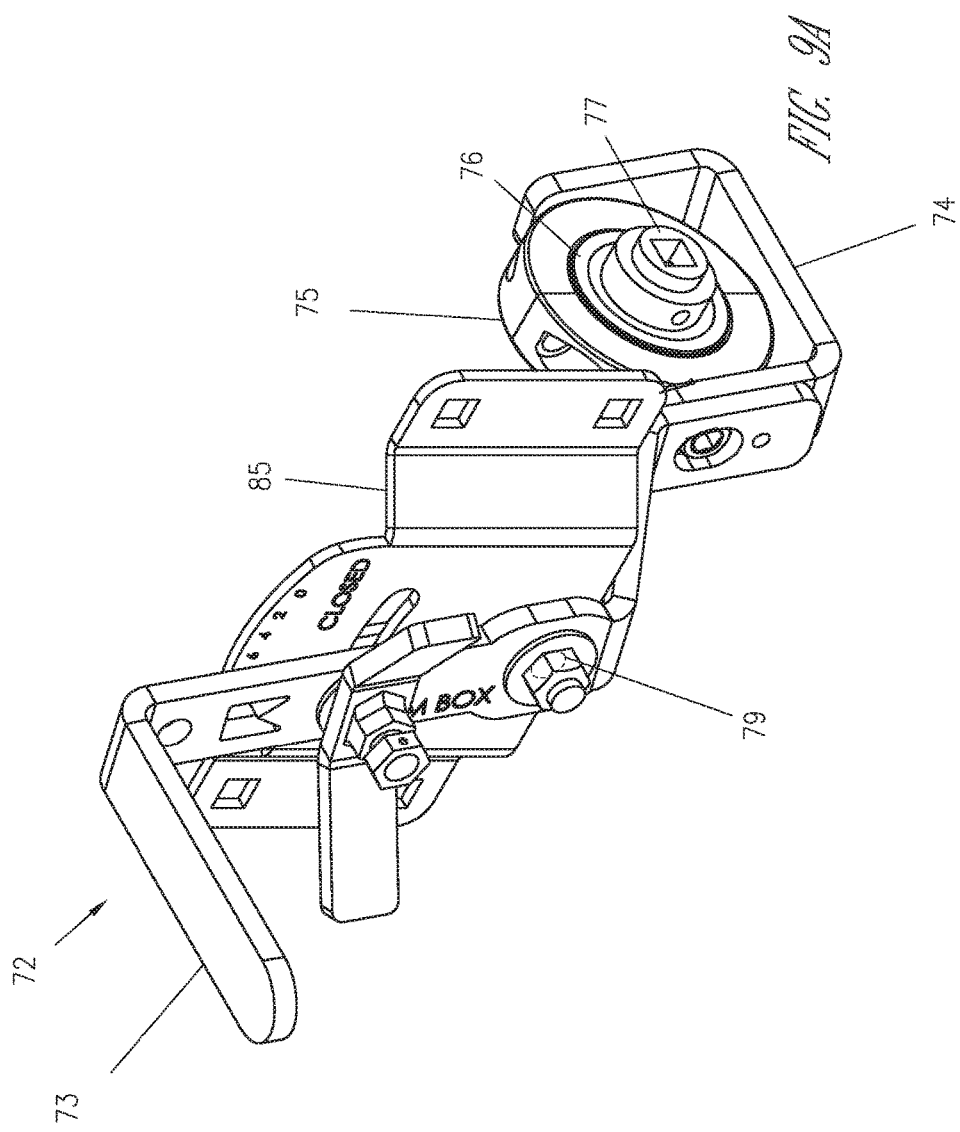

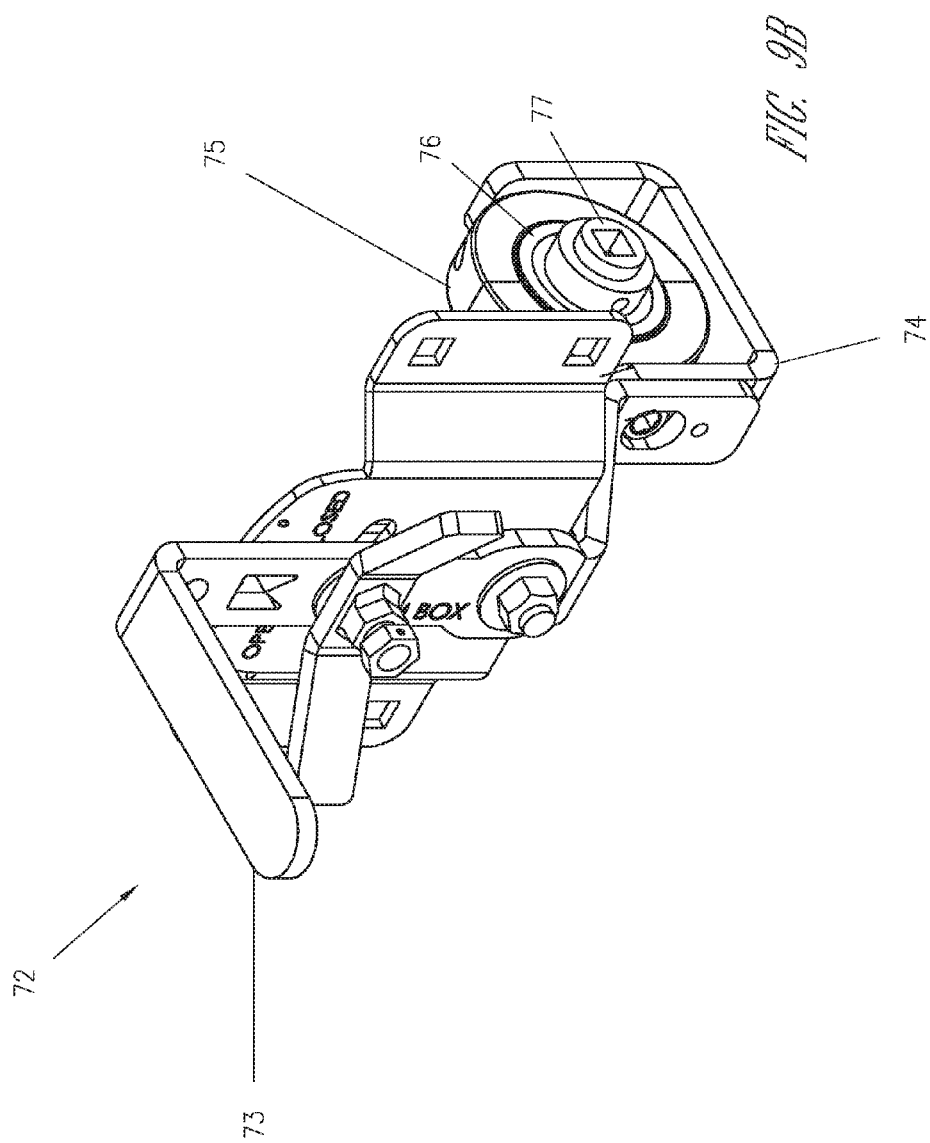

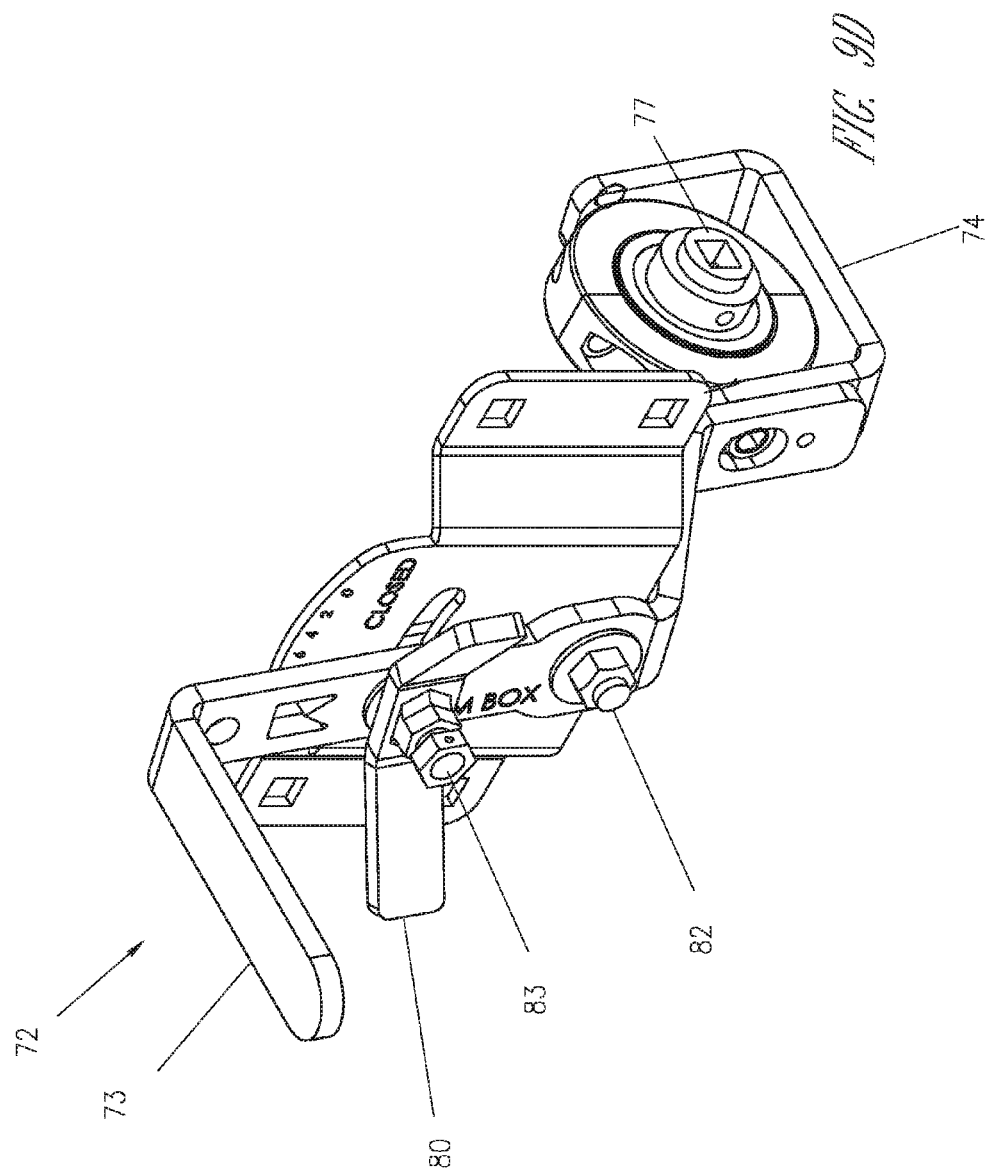

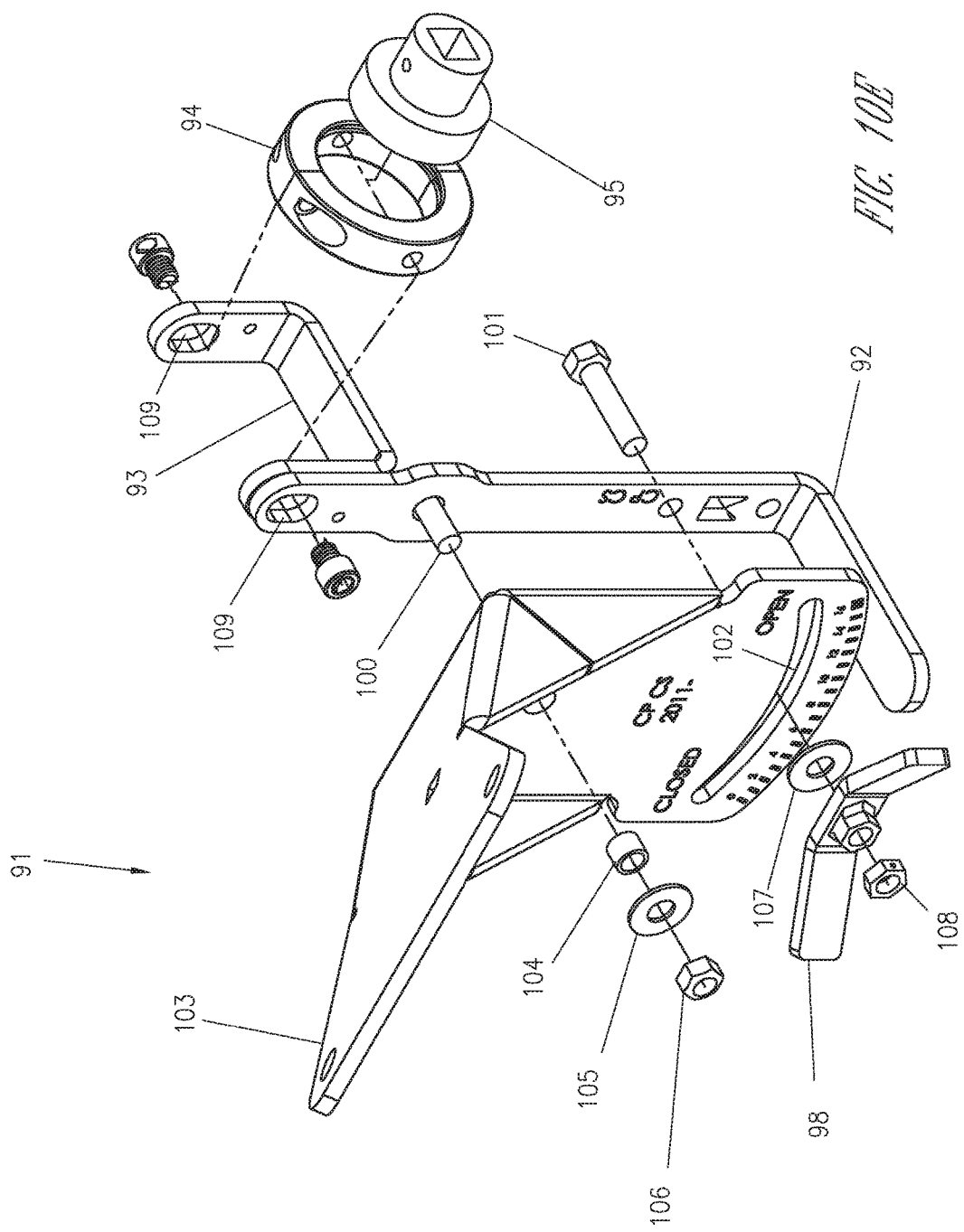

VERSATILE NO-TILL SEED PLANTER

PRIORITY

This application is a Divisional of U.S. patent application Ser. No. 13/428,986, filed Mar. 23, 2012, which application is incorporated by reference herein its entirety.

TECHNICAL FIELD

This application is related generally to implements for planting seed and, more particularly, to no-till seed planters.

BACKGROUND

A no-till planter creates a narrow band of tillage, and plants seed within the narrow band of tillage in a single pass. No-till planting has been employed over rugged, irregular terrain, such as hilly fields and highway rights of way. Some benefits of no-till planting include minimal soil disturbance, weed control, reduced soil erosion, greater moisture control, improved soil quality, and a reduction of fuel costs.

Some known no till planters, also referred to as seed drill planters, may include a wheel mounted frame and one or two ranks of planter assemblies. Such planters may be pulled behind a tractor. Examples of such planters are described in U.S. Pat. Nos. 4,030,428 and 4,977,841, which are herein incorporated by reference in their entirety.

It is desirable to design no-till planters to operate over rough terrain. During the planting operation, for example, the planter is likely subjected to side-to-side forces, and is further subjected to localized forces on individual planter assemblies as the planter negotiates over high and low ground. If the no-till planter operates on uneven ground, the ground underneath an individual planter assembly may be substantially lower than the ground underneath the other planter assemblies. In such circumstances, the planter may not provide the narrow band of tillage in which the seed is planted. The uneven ground may include local high spots, such as a rock, where the ground underneath an individual planter assembly is substantially higher than the ground underneath the other planter assemblies. In such circumstances, it is possible for the entire down force of the planter to be placed on a single planter moving over the rock or other high point. This may damage the frame, the planter assembly, or the mounting structure connecting the planter assembly to the frame. It is desired to improve the planter to operate on such uneven ground. Furthermore, the no-till planter should be designed to avoid damaging forces during transport or prolonged storage.

Planting depth should be able to be accurately controlled according to soil condition, moisture content and seed type. Thus, for example, the planting depth for conventional planting in prepared seedbeds and the planting depth for no-till planting should be the same. No-till planters have no-till disks that are used to cut through the previous plant residue. Conventionally, these no-till disks are manually removed from the planter before the planter may be used to plant seed in prepared seedbeds.

SUMMARY

Various seed planter embodiments may comprise a frame including a main frame section and a furrowing disk frame section. A plurality of planter assemblies may be connected to the main frame section, and a plurality of furrowing disks may be connected to the furrowing disk frame section. At least one linkage may connect the main frame section and the furrowing disk frame section, and at least one motor may be configured to move the furrowing disk frame section with respect to the main frame section, wherein the at least one linkage permits the furrowing disk frame section to move to a low position for no-till planting and move to a high position for tilled planting.

Various seed planter embodiments may comprise a frame, a rock shaft horizontally traversing the frame, and a compliance bar horizontally traversing the frame. A plurality of torsion joints may be operationally positioned about the rock shaft. The planter may include a plurality of planter assemblies, where each planter assembly is connected, via a yoke, to one of the torsion joints. At least one motor may be configured to rotate the rock shaft to position the planter assemblies in a raised position with their yokes in contact with the compliance bar for transport and to rotate the rock shaft to position the planter assemblies in a lowered position for a planting operation.

Various seed planter embodiments may comprise a frame, a seed box on the frame where the seed box includes a plurality of seed openings, a plurality of seed meters where each seed meter configured to control one of the seed openings, and a seed shaft configured to be linearly shifted to control the plurality of seed meters between open and closed positions. The seed planter may include a shifter assembly configured to linearly shift the seed shaft to control the seed meters. The shifter assembly may include a handle, a cradle portion attached to the handle, a bearing structure configured to receive the seed shaft, and a shaft collar configured to receive the bearing structure and pivotally connected to opposing sides of the cradle portion. The cradle portion may include slotted openings in the opposing sides to permit translational motion of the shaft collar with respect to the cradle portion.

Various embodiments comprise a method for operating a seed drill transitioning between prepared seedbeds and no-till soil. The seed drill includes a main frame section with planter assemblies and a furrowing disk frame section configured to be raised and lowered with respect to the main frame section. The method may include lowering the furrowing disk frame section to operationally position furrowing disks in front of planter assemblies to create furrows for no-till planting, and raising the furrowing disk frame section for conventional planting in prepared seedbeds.

This Summary is an overview of some of the teachings of the present application and is not intended to be an exclusive or exhaustive treatment of the present subject matter. Further details about the present subject matter are found in the detailed description and appended claims. The scope of the present invention is defined by the appended claims and their equivalents.

BRIEF DESCRIPTION OF THE DRAWINGS

Various embodiments are illustrated by way of example in the figures of the accompanying drawings. Such embodiments are demonstrative and not intended to be exhaustive or exclusive embodiments of the present subject matter.

FIGS. 2A-2D illustrate an embodiment of a seed drill planter, including positions of the furrowing disk frame section at a down position where the piston of the hydraulic cylinder is retracted (FIG. 2A), at an intermediate position (FIG. 2B), and at a high position where the piston of the hydraulic cylinder is extended (FIG. 2C).

FIGS. 3A-3D illustrate views of the main frame section, and the forward and aft ranks of planter assemblies connected to forward and aft rock shafts, respectively.

FIG. 8A-8B illustrate the ball joint axes for support members that provide stability as the furrowing disk frame section.

FIGS. 9A-9E and 10A-10E illustrate embodiments of shifter assemblies.

DETAILED DESCRIPTION

The following detailed description of the present subject matter refers to the accompanying drawings which show, by way of illustration, specific aspects and embodiments in which the present subject matter may be practiced. These embodiments are described in sufficient detail to enable those skilled in the art to practice the present subject matter. Other embodiments may be utilized and structural, logical, and electrical changes may be made without departing from the scope of the present subject matter. References to "an," "one," or "various" embodiments in this disclosure are not necessarily to the same embodiment, and such references contemplate more than one embodiment. The following detailed description is, therefore, not to be taken in a limiting sense, and the scope is defined only by the appended claims, along with the full scope of legal equivalents to which such claims are entitled.

Figure 1:
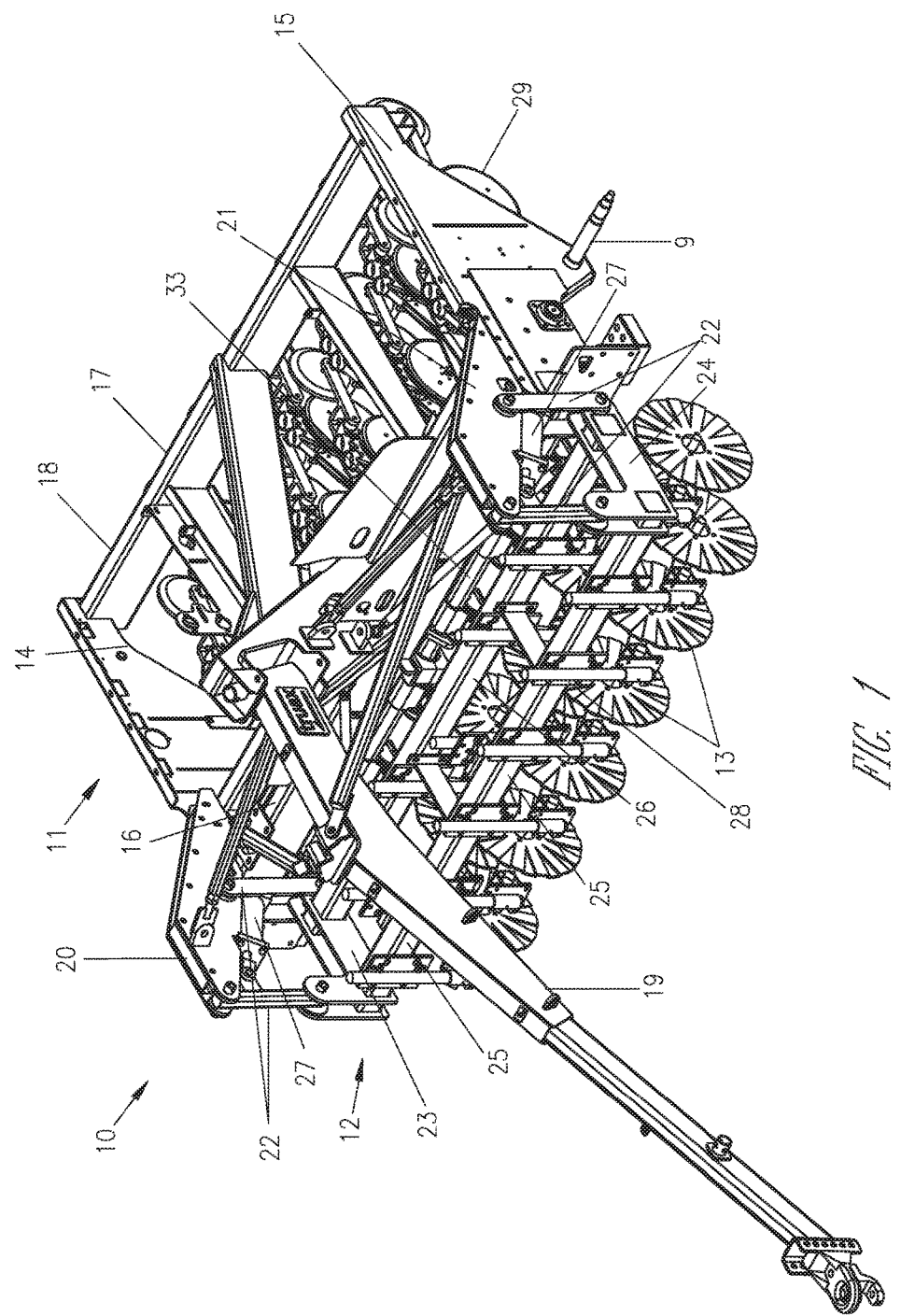
FIG. 1 illustrates an embodiment of a seed drill planter.

FIG. 1 illustrates an embodiment of a seed drill planter. The planter includes a frame having one or more transverse rock shafts, each carrying a rank of seed planter assemblies. The seed planter 10, or seed drill, includes a main frame section 11, and a furrowing disk frame section 12 with furrowing disks 13 attached. The main frame section 11 includes wheel axes 9, enabling wheels to be mounted on the main frame section 11. The seed drill planter may be pulled by a tractor or other vehicle. As will be described in further detail below, the furrowing disk frame section 12 is configured to be raised or lowered with respect to the main frame section 11. Thus, the seed planter 10 is configured to raise the furrowing disks 13, such as may be desired for planting in prepared seedbeds, and to lower the furrowing disks to create the narrow band of tillage for no-till planting. In addition to a high position and a low position, the seed planter may position the furrowing disks in intermediate position(s) between the high position and a low position. Thus, unlike conventional seed drills, the present subject matter can quickly adjust from no-till planting to conventional planting in prepared seedbeds without removing the furrowing disks.

The main frame section 11 includes opposing side members 14 and 15 connected to each other by a rear member 16 and a forward member 17. The main frame section includes a tower 18 onto which a tongue and hitch assembly 19 is attached for towing behind a tractor or other vehicle. Additional structural webs may span various portions of the main frame section to provide additional structural support. The main frame section 11 further includes first and second arms 20 and 21 configured to extend over the furrowing disk frame section 12. The furrowing disk frame section 12 is linked to the first and second arm by linkage members 22. Each of the linkage members 22 has a first end portion attached to an appropriate bearing structure at a connection point in one of the arms 20 and 21 to permit the linkage member to rotate or pivot in at least a limited range. The furrowing disk frame section 12 includes opposing side members 23 and 24, a forward member 25 and a rear member 26. Each of the linkage members 22 has a second end portion attached to one of the side members 23 and 24. The second end portion of each of the linkage members 22 may be attached to an appropriate bearing structure at a connection point in one of the side members 23 and 24 to rotate or pivot in at least a limited range with respect to the side members 23 and 24.

The seed planter 10 may use at least one motor to move the furrowing disk frame section with respect to the main frame section 11. For example, a hydraulic cylinder 27 attached between the main frame section 11 and the furrowing disk frame section 12 may be used to push the furrowing disk frame section away from the main frame section, and thus raise the furrowing disk frame section by the pivoting action of the linkages. The illustrated embodiment includes four linkages of equal length. The use of these linkages allow the furrowing disk frame to maintain its generally planar relationship to the ground as it moves between low and high positions. The linkages permit the furrowing disk frame section to move to a low position for no-till planting and move to a high position planting in prepared seedbeds. The linkages form two opposing sides of a parallelogram, while the distance between the connection points in the arm and the distance between the connection points in the side members of the furrowing disk frame section form the other two sides of the parallelogram.

The furrowing disks 13 are connected to and below the forward and rear members 25 and 26 of the furrowing disk frame section 12. A torsion spring may be used to bias each of the furrowing disks into engagement with the ground. The connection may be an adjustable connection, via the illustrated mounting shaft 28. The adjustable connection allows the distance between the disks and the frame, and thus the depth of the furrow, to be set and adjusted for the planting requirements for the seed and soil condition. The illustrated seed planter includes two ranks of furrowing disks, corresponding to the two ranks of planter assemblies. A forward rank of furrowing disks is aligned with a corresponding forward rank of planter assemblies, and an aft rank of furrowing disks is aligned with a corresponding aft rank of planter assemblies. Thus, each furrowing disk 13 is inline with and in front of a planter assembly 29 that is attached to the main frame section, allowing the planter assembly to follow the disk and plant a seed in a furrow prepared by the disk.

Figure 2A:
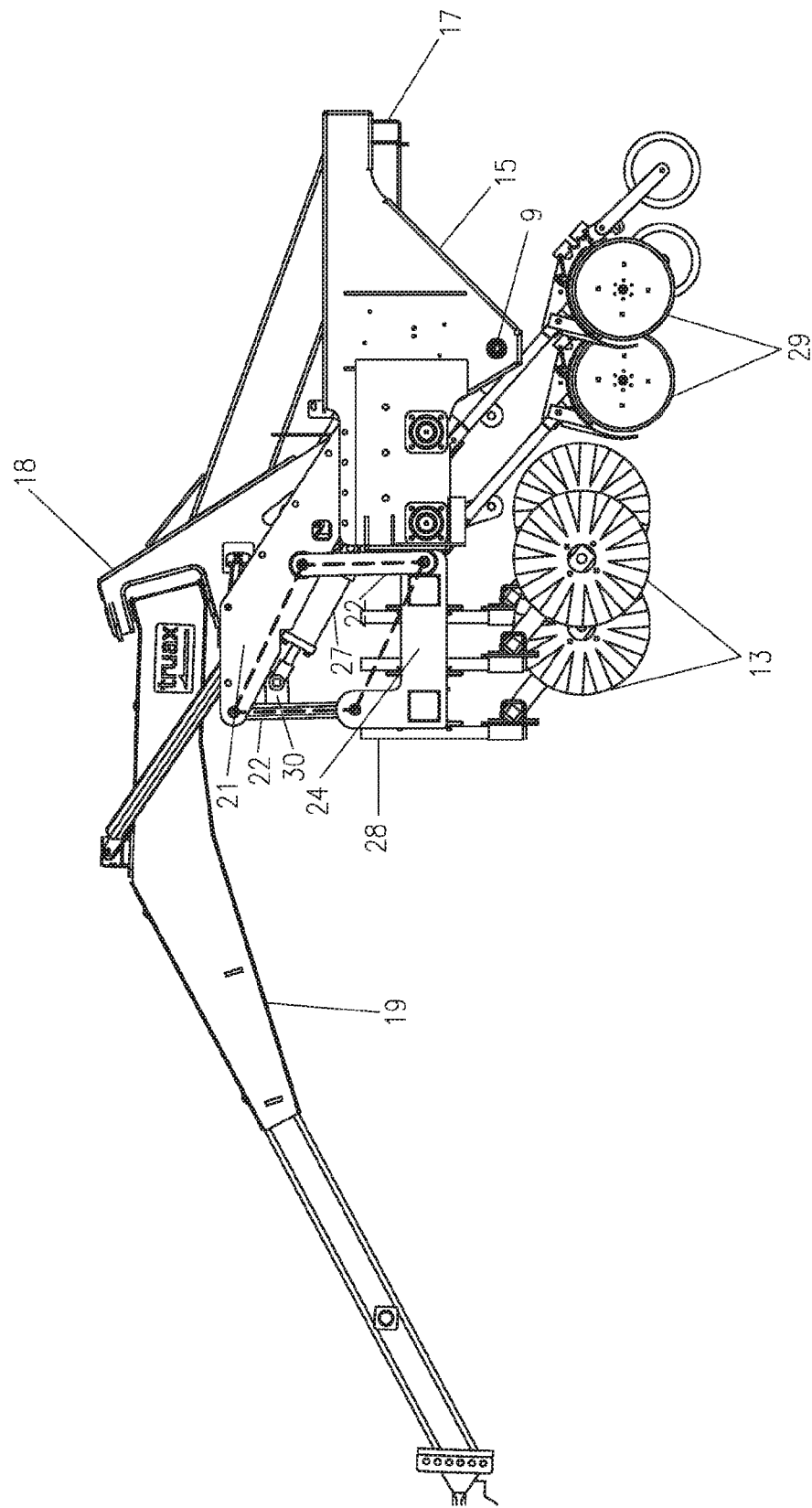
Figure 2B:
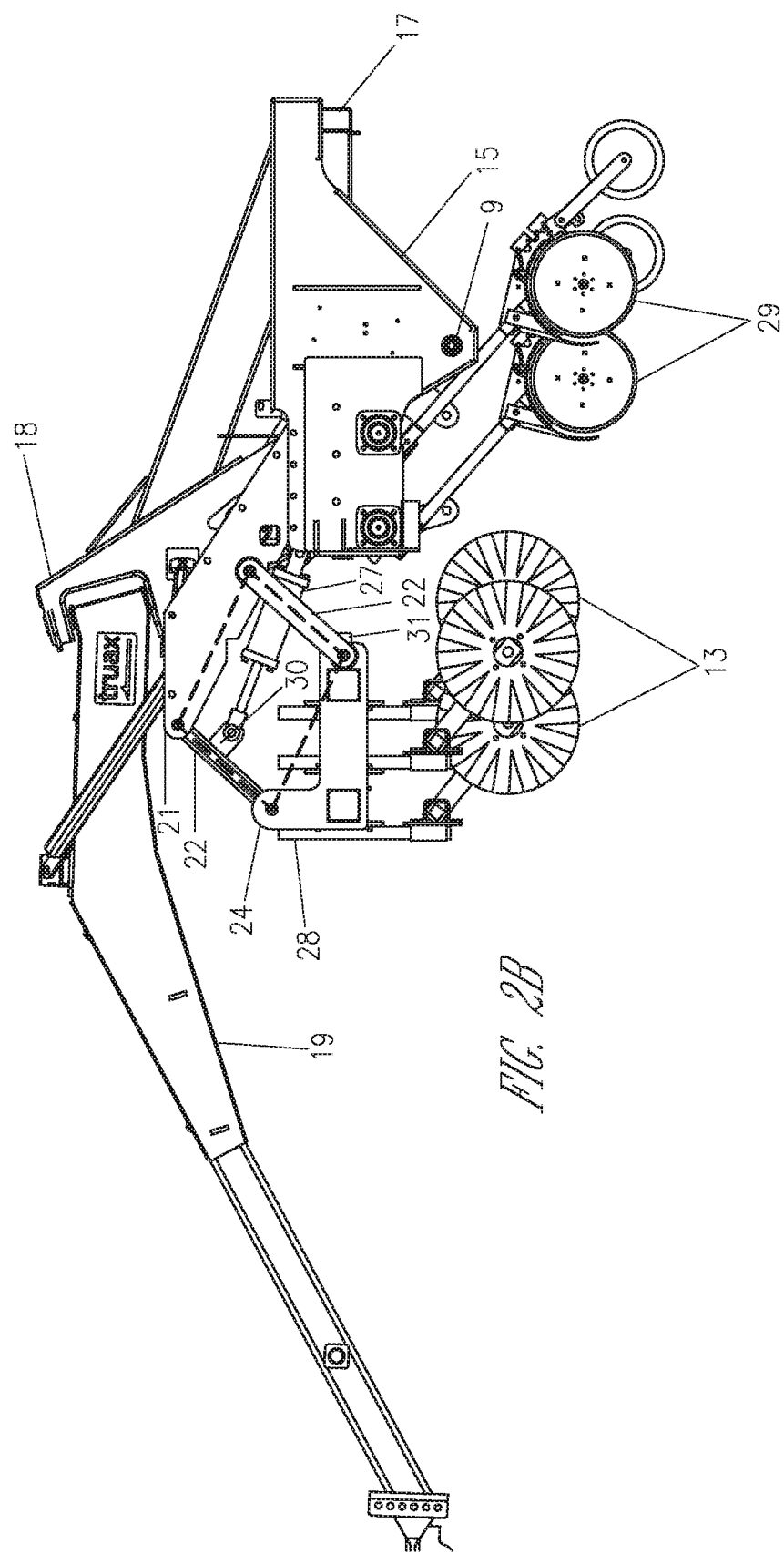

FIGS. 2A-2C illustrate positions of the furrowing disk frame section 12 at a down position where the piston of the hydraulic cylinder is retracted (FIG. 2A), at an intermediate position (FIG. 2B), and at a high position where the piston of the hydraulic cylinder is extended (FIG. 2C). The bottom surface of the side member 24 remains parallel to the ground through this motion. Thus, the furrowing disks can operate in the down position (FIG. 2A), but also can operate to provide a desired tillage depth in some raised positions for both the front and back ranks of disks. The parallelogram, with vertices at the linkage connection points in the arm 21 and side member 24, is illustrated through this motion. FIGS. 2A-2C also illustrate a hydraulic attachment or boss 30 on the forward linkage. The distal end of the hydraulic cylinder's piston can be attached to the hydraulic attachment. The piston pushes against this attachment to push out the linkage forward linkage, and thus, push the furrowing disk frame section 12 away and up from the main frame section 11.

Figure 2D:
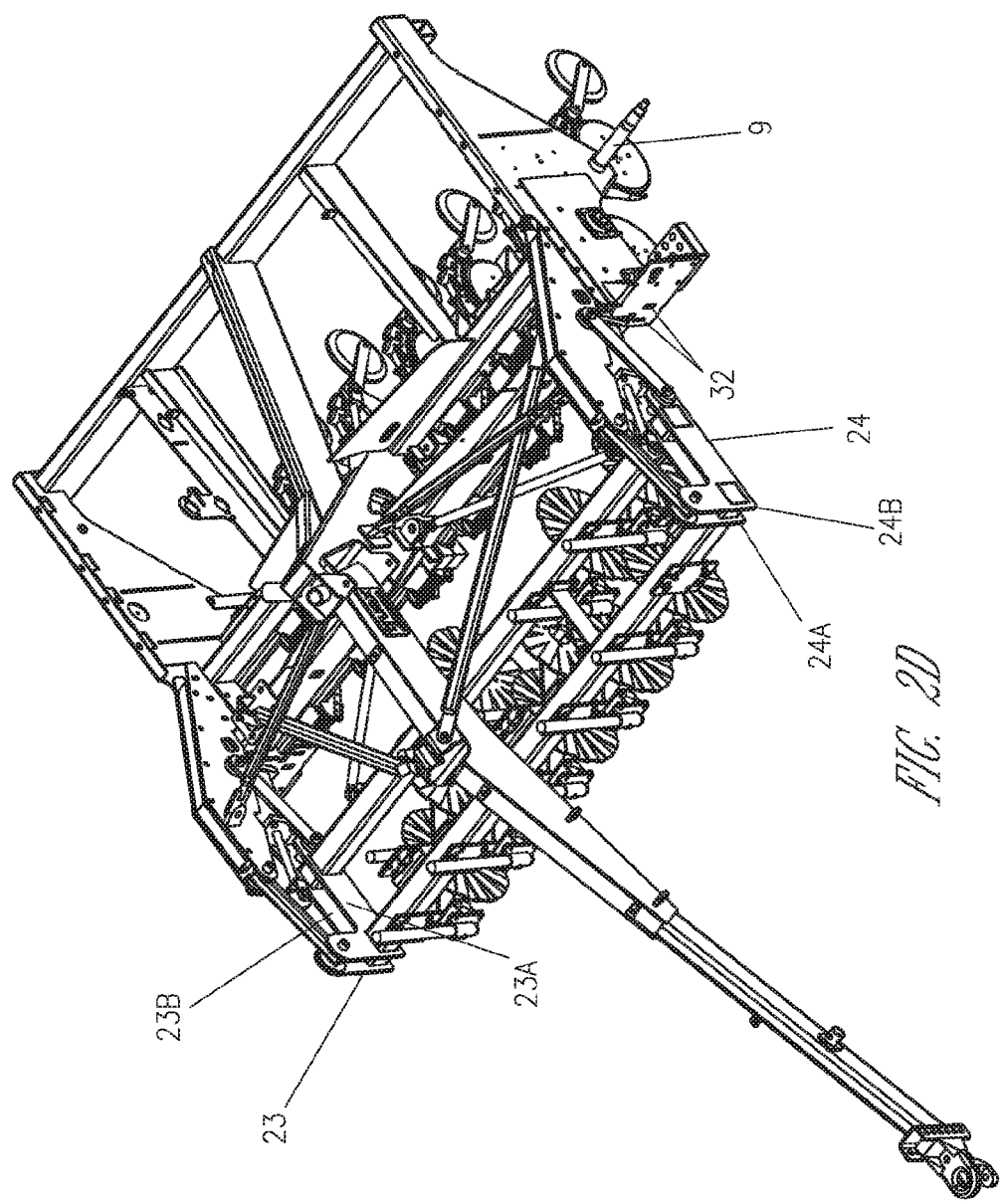

FIG. 2B further illustrates a protrusion 31 extending from the side member 24. As illustrated in FIG. 2D, side member 24 may comprise two generally parallel plates 24A and 24B, and side member 23 may comprise two generally parallel plates 23A and 23B. Each plate of the side members may include its own protrusion, which fit into slots 32 in the main frame section 11 when the furrowing disk frame section 12 is lowered into the down position. These protrusions and slots cooperate to secure the furrowing disk frame section 12 in position with respect to the main frame section 11, preventing side-to-side motion when the furrowing disk frame section 12 is in the down position. Thus, during a no-till planting operation when the furrowing disk frame section is lowered, the furrowing disks and planter assemblies remain aligned so that the seeds are planted in the furrows.

FIGS. 3A-3D illustrate views of the main frame section 11, and the forward and aft ranks of planter assemblies connected to forward and aft rock shafts, respectively. The rock shafts extend between the opposing side members 14 and 15 of the main frame section 11. The forward rock shaft 33 is mounted laterally, traversing across the main frame section 10 near the forward end thereof. The forward rock shaft 33 is connected by suitable bearing structure 34 to side frame members 12, 14. The forward rock shaft 33 carries a forward rank of planter assemblies. The aft rock shaft 35 is mounted laterally, traversing across the main frame section 11 at a location spaced rearward of forward rock shaft 33 and is connected to side frame members 12, 14 by suitable bearing structure 36. The aft rock shaft 35 carries an aft rank of planter assemblies. A rank of planter assemblies may be raised and lowered by rotating the corresponding rock shaft.

Motor(s), such as hydraulic cylinders, may be connected between the frame main frame section and offset connections to control the rotation of rock shafts 33, 35. For example, L-shaped crank arms may provide the offset connections. An offset connection 37 may be used to connect the aft rock shaft 35 to a hydraulic cylinder 38 as illustrated in FIG. 3C. In like fashion, an offset connection may be used the forward rock shaft to a hydraulic cylinder. The rotation of the rock shafts 33, 35 may be used to lower the planter assemblies into a working position and to raise the planter assemblies into a transport position. Each planter assembly is connected to its respective rock shaft 33, 35 via its yoke 39. The yoke 39 is connected to a bracket 40, and the bracket 40 is functionally positioned about the rock shaft 33, 35. The torsion joint 41 includes a generally square housing that surrounds the shaft 33, 35, and resilient torsion spring elements 42 positioned in the interior corners of the housing bearing against a flat surface of the rock shaft 33, 35 for compression upon rotation of the planter assembly with respect to the rock shaft. The torsion joint is illustrated in more detail in FIGS. 4A-7B.

Each planter assembly includes a planter shoe 43, a disk assembly 44, and a press wheel assembly 45. The disk assembly 44 includes a pair of circular disks or blades 46 disposed in spaced relationship with forward edges converging toward one another. The upper edges of the blades 46 are accommodated by the planting shoe 43 on which the blades 46 are rotatably mounted. The planter shoe 43 includes seed drops 47 for connection to seed tubes. Seed flows from a seed hopper or seed box through the seed tube into the seed drops of the planter shoe for dropping seed into the furrow formed by the blades 46. The press wheel assembly 45 includes a press wheel 48 and a press wheel yoke 49 configured to attach the press wheel 48 to the planter shoe 43. The press wheel 48 follows the disk assembly 44, and closes the furrow after the seed has been planted in the furrow. A torsion spring may be used to bias the press wheel into engagement with the ground.

Figure 3B:
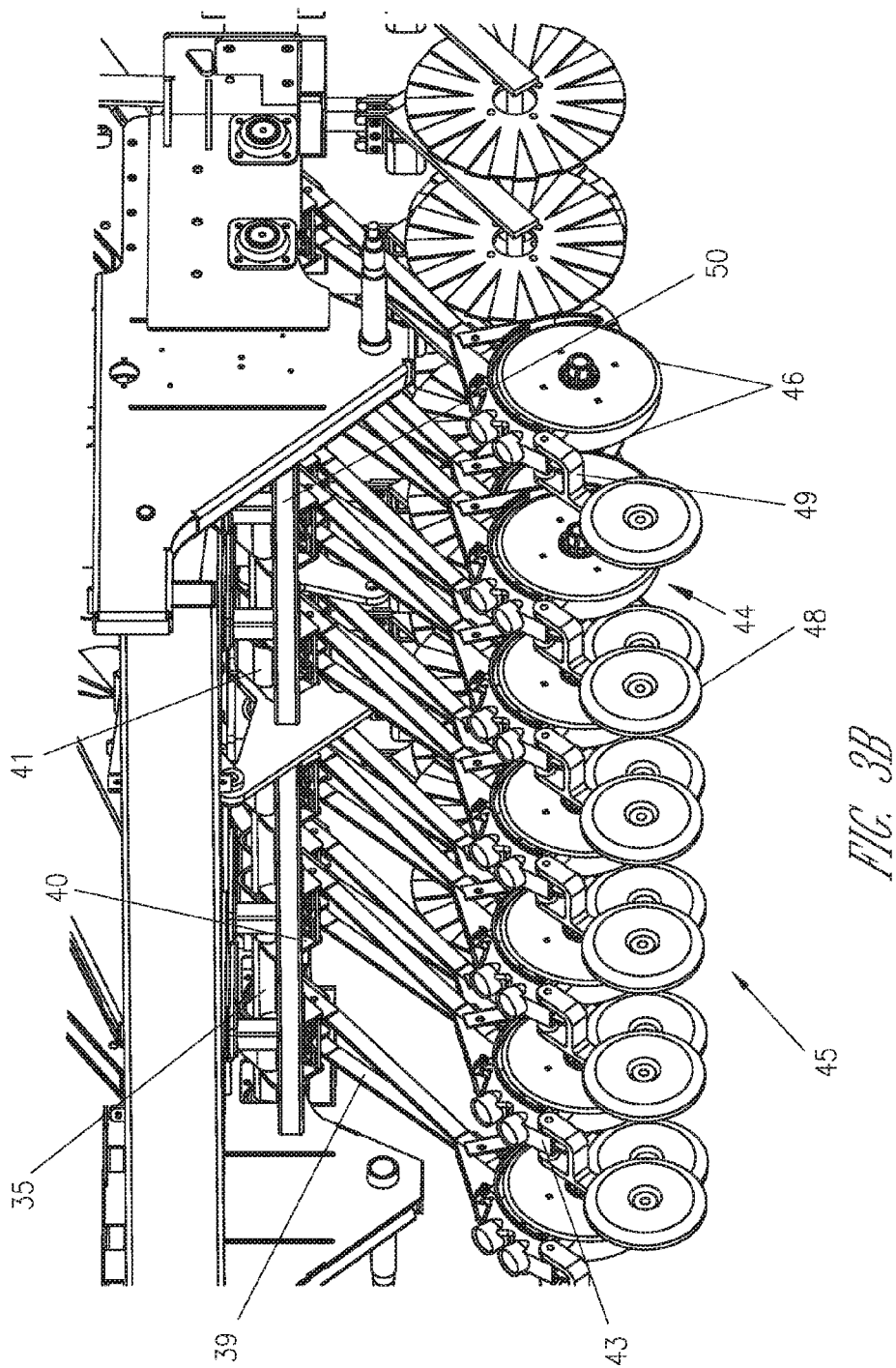

The illustrated seed planter is configured to lower the ranks of planter assemblies to a down position, such as illustrated in FIG. 3B, and to raise the ranks of planter assemblies into an up position, such as illustrated in FIG. 3C. The lower position places the planter assemblies into operational contact with the ground for performing a planting procedure. The upper position places the planter assemblies in a transport position. In the upper or raised position, the yokes 39 of the planter assemblies are lifted into contact with a compliance bar 50 that extends between the opposing side members 14 and 15 of the main frame section 10. The compliance bar prevents the planter assemblies from experiencing potentially damaging up-and-down motion, and side-to-side motion during transport. For planters with two ranks of planter assemblies, a forward compliance bar may be used with the forward rank of planter assemblies, and an aft compliance bar may be used with the aft rank of planter assemblies.

A plurality of seed boxes 51, 52, 53, as illustrated in FIG. 3D, are mounted on the main frame section 10. Seed distribution hoses extend from each of the seed boxes to seed transitions 54. Each seed transition 54 corresponds to one of the planter assemblies. A seed tube maybe used to connect a seed transition to a corresponding seed drop 47 of a corresponding planter assembly. The seed boxes may contain seed picker apparatus (not shown) (for example see U.S. Pat. No. 4,030,428 to Truax, incorporated herein by reference in its entirety) to move seed from the box to the seed hoses. The seed boxes may be used to store different types of seed, and the seed flow to the planter assembly may accommodate the specific requirements, such as size, for the seed. Thus, according to some embodiments, seed may flow from a box, through a seed hose to the seed transition, and from the seed transition through the seed tube to the planter assembly.

FIGS. 4A-7B generally illustrate an example of a torsion joint and its function at different planter assembly positions. The torsion joint assembly 41 permits up and down rotation of the planter assembly 29. The rock shafts 33, 35 and the housing 55 of the torsion joint 41 are flat sided polygonal members shown as rectangular in cross sectional shape. The housing 55 has inside dimensions greater than the outside dimensions of the rock shafts 33, 35 and the housing 55 spans a segment of the rock shafts 33, 35. The housing 55 is diagonally oriented with respect to rock shafts 33, 35 such that the inside corners of housing 55 generally face flat surfaces of rock shafts 33, 35. The housing 55 contains resilient torsion spring elements 42, which may be formed of an elastomer-type material. As shown, four torsion spring elements 42 are installed in joint 41. Each spring element is installed in an interior corner of housing 55 in snug relationship between the corner and an opposing flat surface of the rock shaft 33, 35 substantially filling the space therein. Each torsion spring element may be formed of a resilient, strong plastic or rubber material which is resiliency deflectable under load. The spring elements are of a length to generally span the width of housing 55. A flexible elastomer type material such as urethane, neoprene, butyl or similar material may be used to provide the characteristics of resiliency, high compression strength and resistance to outdoor elements. The elastomer preferably has an elasticity characteristic of approximately 70-80 durometer hardness. In a preferred embodiment, spring elements 42 have a cylindrical shape when they are not deflected. The back of the housing is closed by a mounting plate 56. The mounting plate 56 is fixed to the yoke 39. Rotational movement of the housing 55 relative to the rock shaft 33, 35 results in deformation of the torsion spring elements 42, which produce a force to return the housing 55, and thus the planter assembly attached to the housing 55 through the yoke 39 and the mounting plate 56, back to its original orientation with respect to the rock shaft 33, 35. A stop plate 57 is fixed to the mounting plate 56 and rotates with it relative to the rock shaft 33, 35. The stop plate 57 has an edge with an edge profile that defines an open jaw which at least partially encompasses the rock shaft 33, 35. The jaw opening in the stop plate 57 is configured to permit limited rotational movement of the rock shaft within the jaw opening. According to various embodiments of the present subject matter, the edge profile is configured to permit limited rotational motion to allow an individual planter assembly within a rank of planter assemblies to follow, within limits, both low areas and high areas in uneven ground. Thus, by permitting this motion for individual planters, the present subject matter avoids significant stress if a planter assembly hits a rock.

Figure 4A:
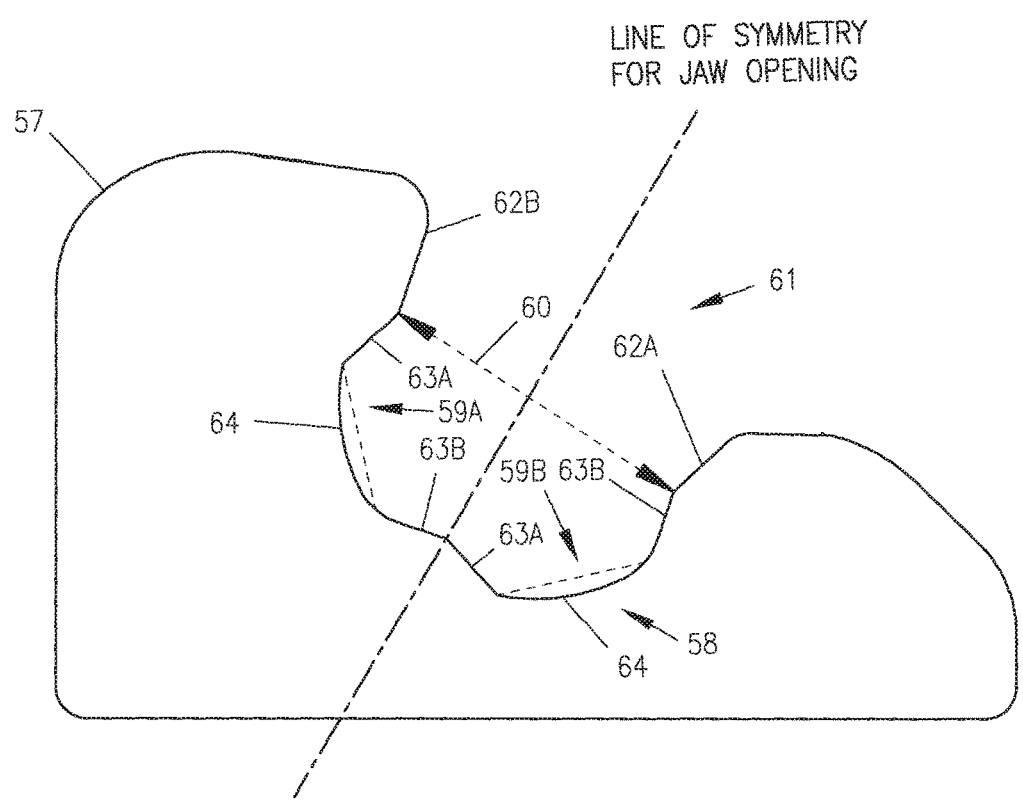
FIGS. 4A-7B generally illustrate an example of a torsion joint and its function at different planter assembly positions.

With reference to FIG. 4A, the edge profile of the stop plate 57 that defines the open jaw generally includes an interior portion 58 defining an open area with a first lobe 59A and a second lobe 59B, and further defining an opening 60 to the open area. The open jaw further includes an exterior portion 61 flaring out from the opening 60. The exterior portion 61 of the edge profile includes a first surface 62A and a second surface 62B. The interior portion 58 of the edge profile includes first regions 63A and second regions 63B for each of the lobes, and further includes dwell regions 64 in between the first and second regions 63A and 63B. The rotational motion between the rock shaft 33, 35 and the stop plate 57 is limited in a first direction (referred to herein as a "first limit") and is limited in a second direction (referred to herein as a "second limit"). The first surface 62A of the exterior portion 61 and the first regions 63A of the interior portion 58 cooperate to abut against the rock shaft 33, 35 at the first limit; and the second surface 62B of the exterior portion 61 and the second regions 63B of the interior portion 58 cooperate to abut against the rock shaft 33, 35 at the second limit. The surfaces 62A and 63A form a first set of surfaces that control a first limit of rotation, and the surfaces 62B and 63B form a second set of surfaces that control a second limit of rotation. The edge profile within each lobe 59A and 59B has a dwell portion 64. The dwell portions are configured to allow a corner of the rock shaft 33, 35 rotate between the first and second limits. Thus, edge profile defines open space lobes, where each lobe corresponds to a corner of the generally square cross section of the rock shaft. Each lobe has a first region that contacts a side of the rock shaft at the first limit of rotation, a second region that contacts an adjacent side of the rock shaft at the second limit of rotation, and a dwell region that permits the corner between the adjacent sides to rotate between the first and second limits. The dwell portion enables the limited rotation motion, while the first and second sets of surfaces provide the limits on the motion.

Upon a pre-determined amount of rotation (i.e. first limit and second limit) the jaw locks or jams on the rock shaft by intercepting the surfaces of the rock shaft to prohibit further movement of the torsion joint housing on the rock shaft. This permits normal up and down movement of the planter assembly going over rough ground. The stop plate 57 prevents extreme rotation of the torsion joint housing on the rock shaft that would cause the torsion joint spring elements to become dislodged from their proper positions in the torsion joint housing. If the torsion joint spring elements became dislodged from their proper positions, then the spring elements would no longer provide the desired return force to return the torsion joint housing back to its neutral position.

The planter assemblies have the capacity for up and down movement relative to the rock shaft by virtue of the torsion joint. The planter assemblies may be raised into a transport position, and may be lowered into operational position with the ground. When operating with the planter assemblies lowered, the planter assemblies may move over irregular terrain and it is desirable that the planter assemblies follow the ground irregularities, at least to a limited degree. Therefore, a mechanism for allowing a significant range of permissible rotation while limiting the rotation beyond the range is desirable. The permitted movement of the planter assemblies, from a neutral position, may be referred to as a stroke control.

As illustrated in FIG. 4A, the jaw opening in the stop plate 57 has a symmetry or substantial symmetry about the illustrated line of symmetry. For example, the first and second lobes 59A and 59B are or substantially are mirror images of each other. As a result, from a neutral position where the corners of the rock shaft are centered or substantially centered in the dwell regions 64 of each lobe 59A and 59B, the stop plate 57 allows equal or substantially equal but opposite rotational motion to the first and second stop limits. The neutral position is generally illustrated in FIGS. 5A and 5B, and is discussed in more detail below.

Figure 4B:
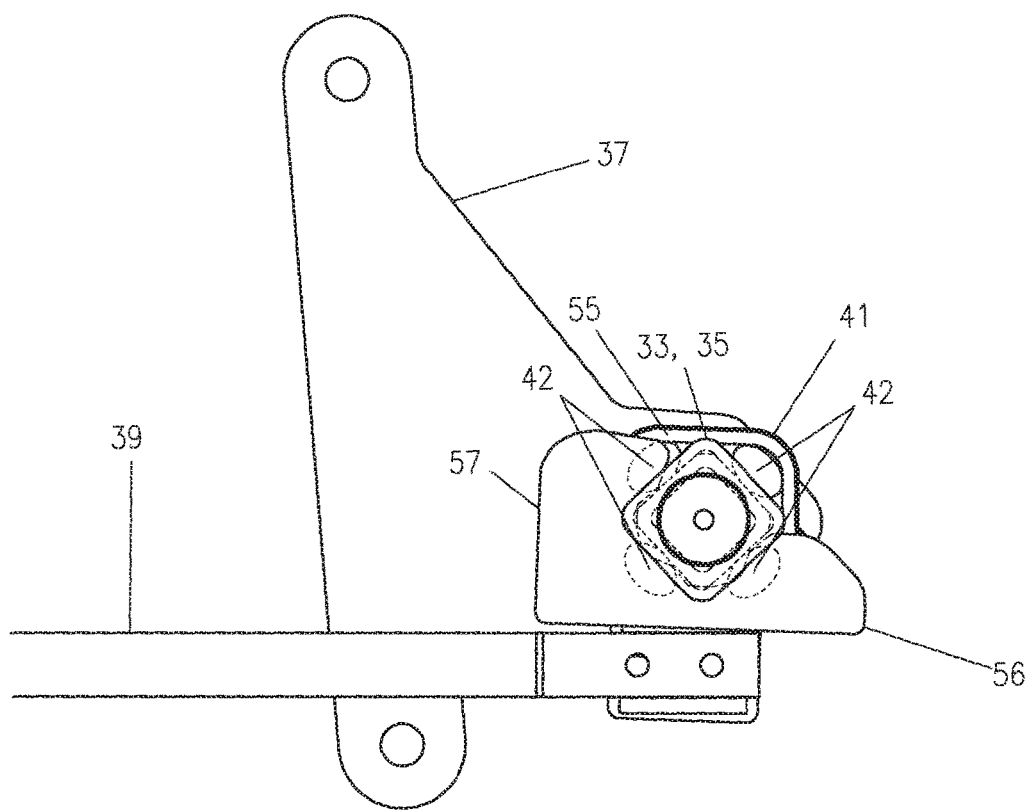
Figure 4C:
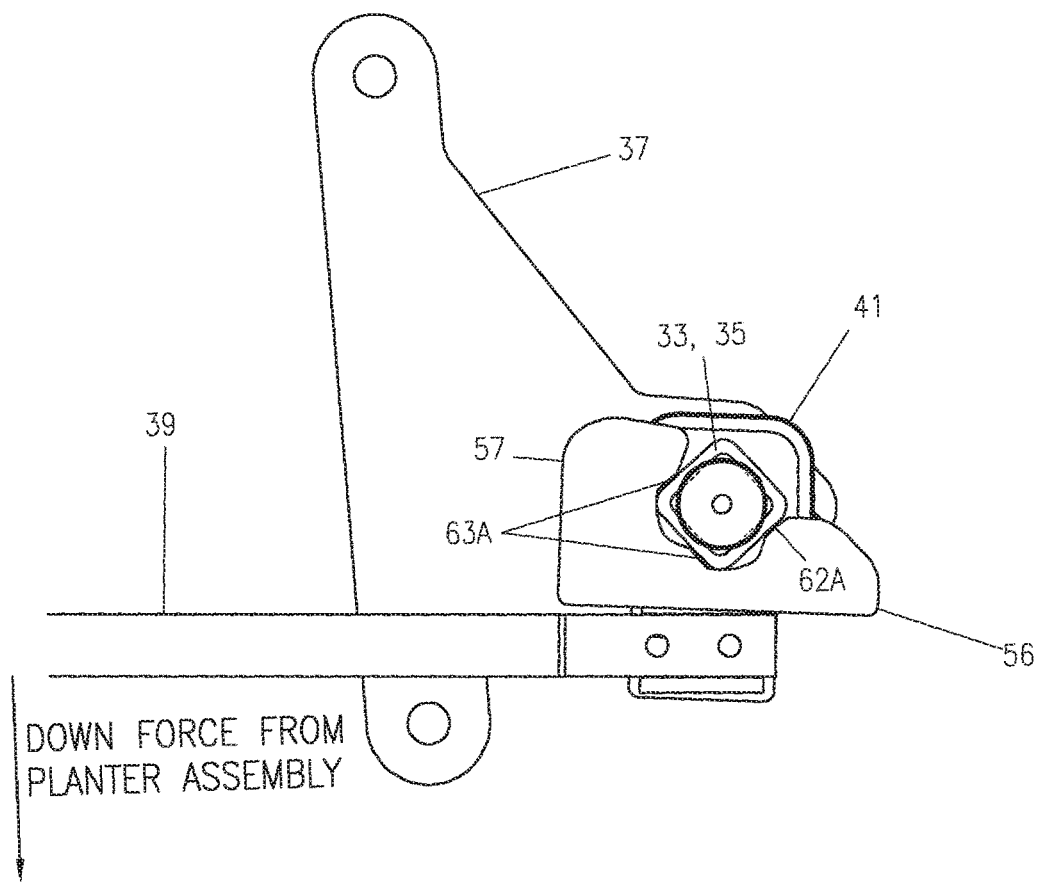

FIGS. 4B-4C illustrate the stroke control when the planters have been raised into a transport position. FIG. 4B generally illustrates the torsion joint 41 when the planters have been raised into a transport position, and FIG. 4C generally illustrates the interaction between the stop plate and the rock shaft when the planters are raised into the transport position. The planter assemblies have been raised by a hydraulic cylinder operating on the offset connection 37, and thus the yoke 39 pivots to a more horizontal position. The weight of the planter assembly in the transport position provides a down force on the yoke 39, which causes the stop plate to rotate in a counter clockwise direction. The first set of surfaces provides a first limit for the rotation in this rotational direction. At the first limit, the rock shaft contacts the first surface 62A of the exterior portion and the first regions 63A of the interior portion. Thus, the weight of the planter assembly is carried by the stop plate instead of the torsion spring elements.

Figure 5A:
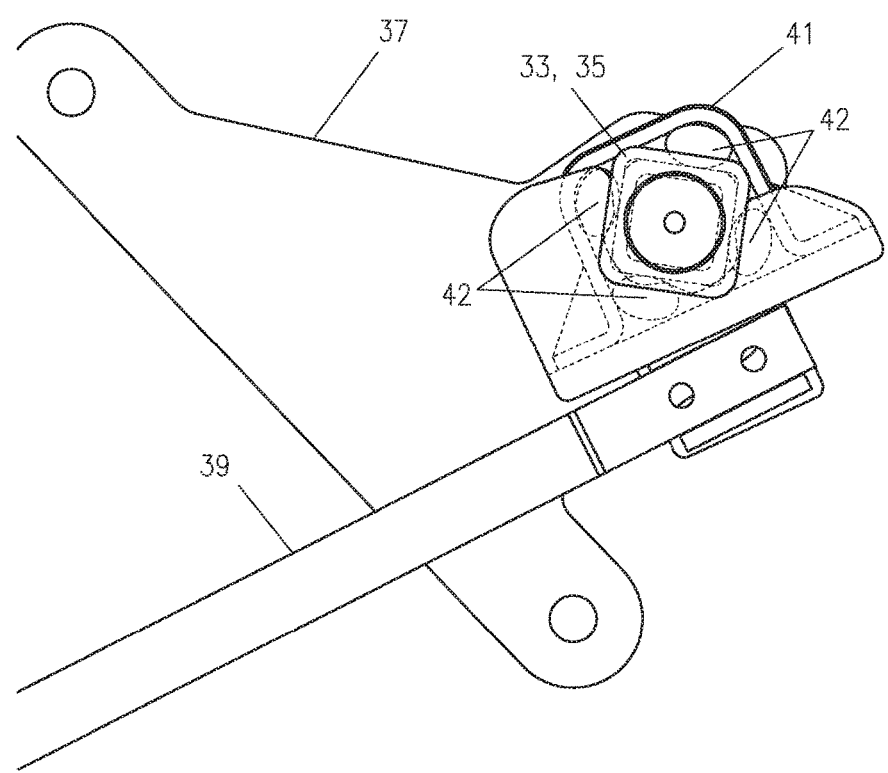
Figure 5B:
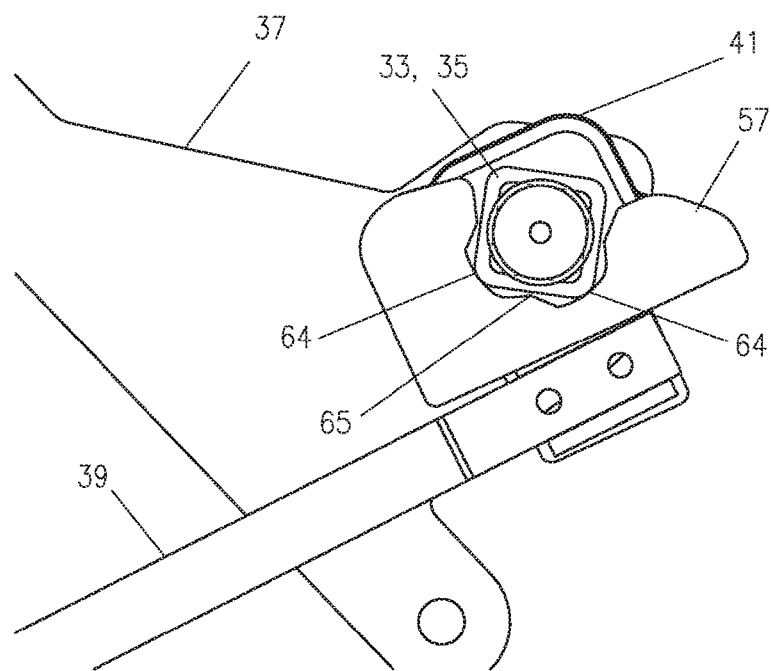

FIGS. 5A-5B illustrate the stroke control when the planter assemblies have been lowered into an operation position at a neutral or generally neutral ground height. FIG. 5A generally illustrates the torsion joint 41 when the planters have been lowered into operational position, and FIG. 5B generally illustrates the interaction between the stop plate and the rock shaft when the planters are lowered into the operational position. The planter assemblies have been lowered by a hydraulic cylinder operating on the offset connection 37, and thus the yoke 39 pivots downward to a more horizontal position. The weight of the planters on the end of the yoke 39 is being borne by the ground. This ground position is a neutral ground position, as the spring elements 42 are not being compressed significantly by either a clockwise or counterclockwise motion of the torsion joint 41. As illustrated in FIG. 5B, the corners of the rock shaft are at the dwell portions of the stop plate 57 and have limited freedom to rotate in either a clockwise or counter clockwise direction until the first or second limits are reached. The edge profile of the stop plate 57 includes a protrusion 65 that helps define the first and second open space lobes. This protrusion 65 is generally centered along a flat side of the rock shaft in the neutral ground height position, and the corners of the rock shaft are generally centered within the dwell regions 64 of each lobe. As illustrated in FIG. 4A and discussed above, the open jaw of the stop plate 57 has a symmetrical or generally symmetrical shape with first and second limits that provide generally equal but opposite freedom of rotational motion. A benefit of the symmetrical shape is that individual planters have more freedom to travel over high ground (e.g. a rock), as illustrated in FIGS. 6A-6B and discussed below.

Figure 6A:
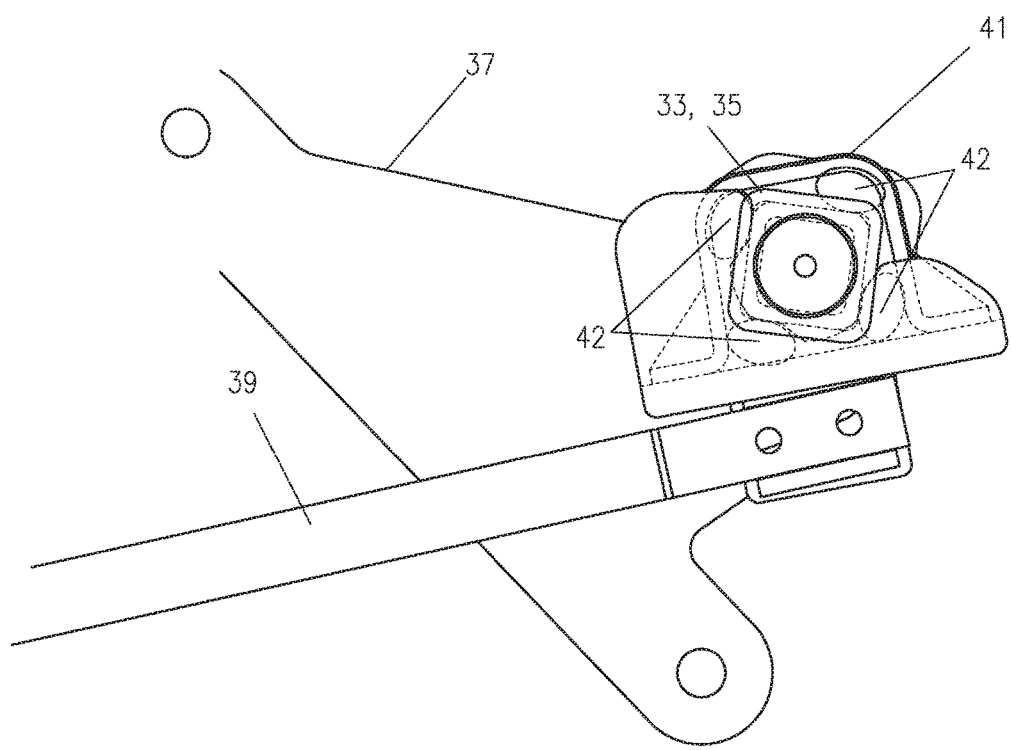
Figure 6B:
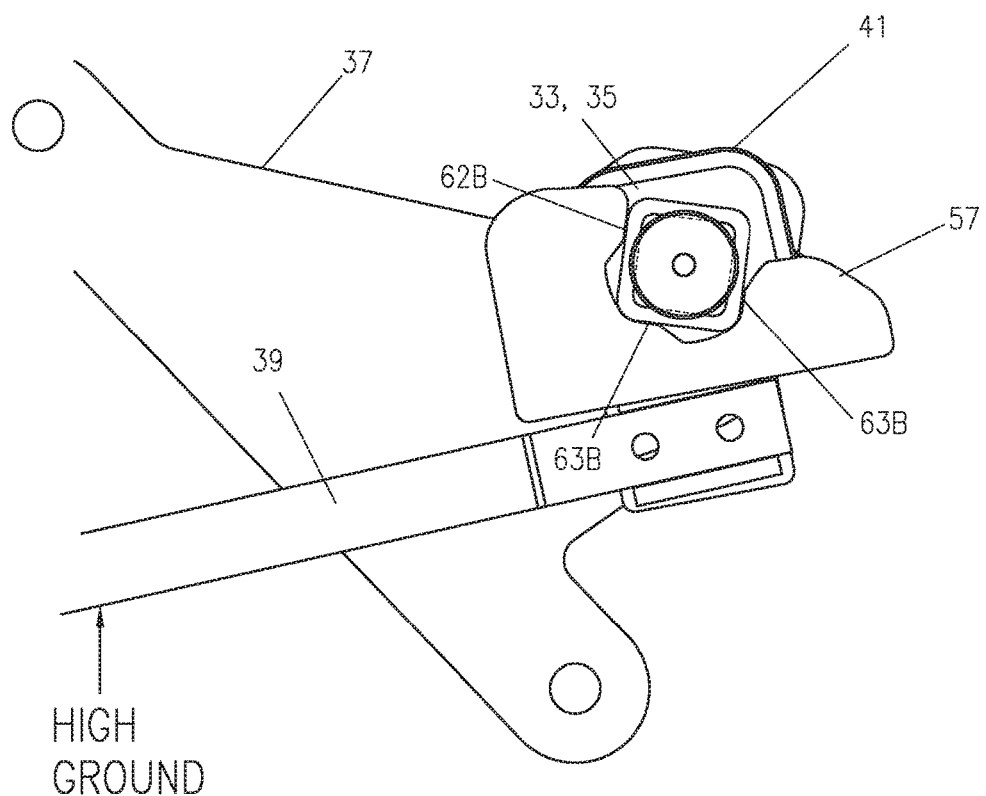

FIGS. 6A-6B illustrate the stroke control when the planter assemblies have been lowered into an operation position at at a neutral ground height, but a planter assembly encounters high ground with respect to the neutral ground height. FIG. 6A generally illustrates the torsion joint 41 when its planter assembly hits a high ground, and FIG. 6B generally illustrates the interaction between the stop plate and the rock shaft when planters are lowered into the operational position but the corresponding planter assembly encounters high ground. An upward force on the yoke caused by the high ground causes the stop plate to rotate in a clockwise direction. The stop plate allows this rotation until the second limit is reached. At the second limit, the rock shaft contacts the second surface 62B of the exterior portion and the second regions 63B of the interior portion. Thus, the stop plate 57 accommodates local high ground (e.g. a rock) with significant, but limited rotation of the torsion joint.

Figure 7A:
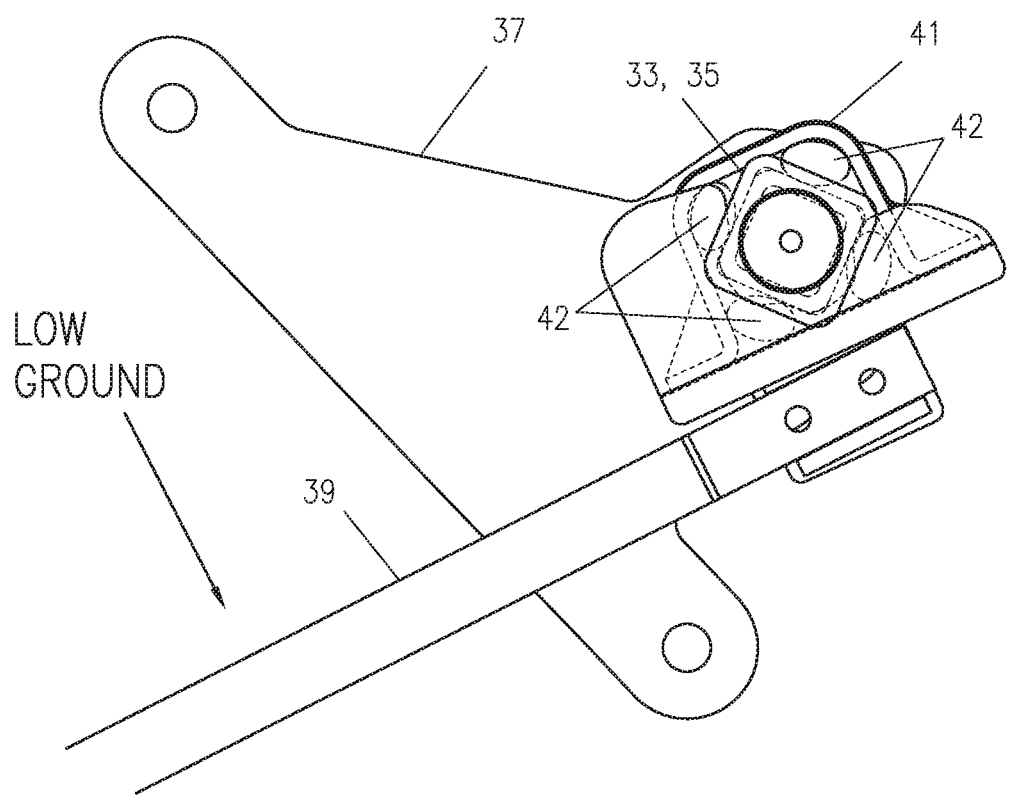
Figure 7B:
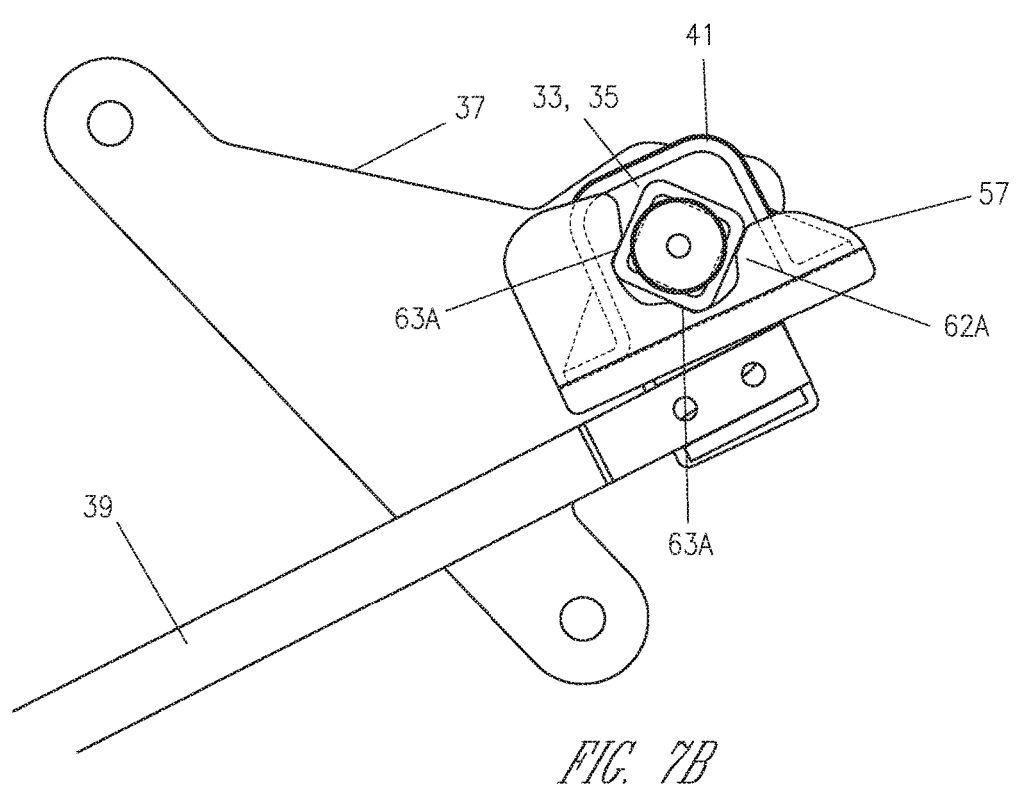

FIGS. 7A-7B illustrate the stroke control when the planter assemblies have been lowered into an operation position at at a neutral ground height, but a planter assembly encounters low ground with respect to the neutral ground height. FIG. 7A generally illustrates the torsion joint 41 when its planter assembly hits a low ground, and FIG. 7B generally illustrates the interaction between the stop plate and the rock shaft when planters are lowered into the operational position but the corresponding planter assembly encounters low ground. An downward force on the yoke caused by the weight of the planter assembly as the planter assembly encounters the low ground causes the stop plate to rotate in a counter clockwise direction. The stop plate allows the rotation until the first limit is reached. At the first limit, the rock shaft contacts the second surface 62A of the exterior portion and the second regions 63A of the interior portion. Thus, the stop plate 57 accommodates local low ground with significant, but limited rotation of the torsion joint to allow the planter assembly to follow the low ground.

Figure 8B:
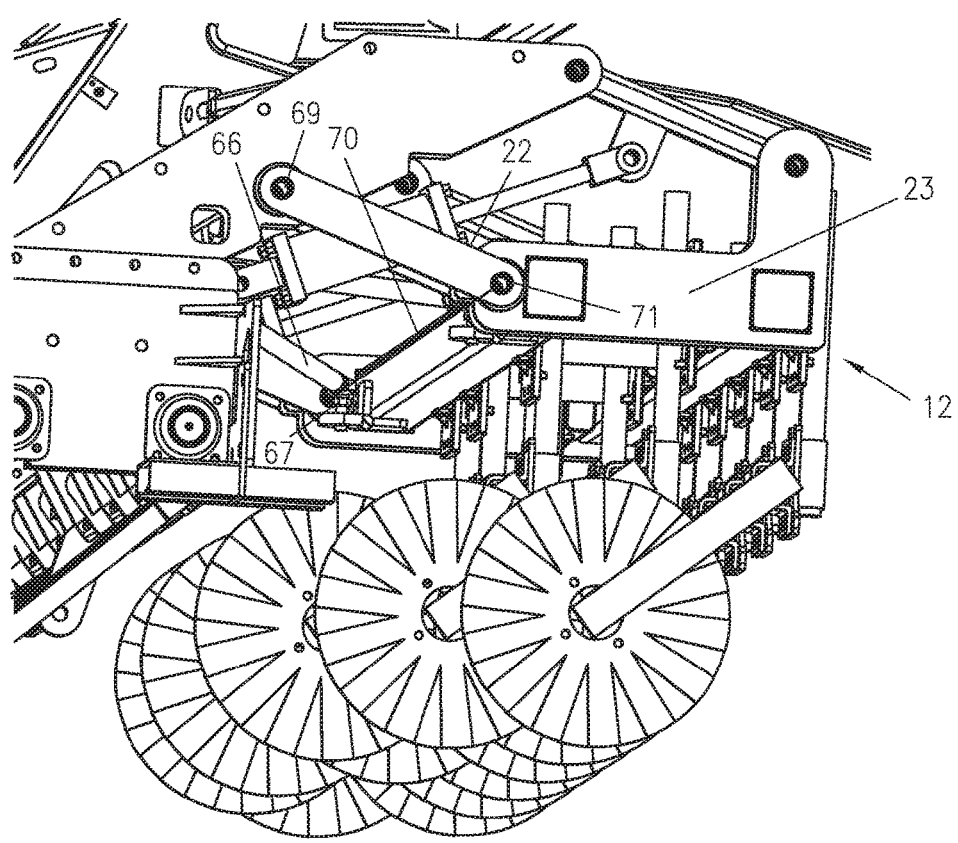

FIG. 8A-8B illustrate the ball joint axes for support members that provide stability as the furrowing disk frame section 12. These support members 66 are configured to allow the furrowing disk frame section 12 to move into raised and lowered positions, while limiting potentially damaging side-to-side motion. Two support members 66 are illustrated, providing a stability connection between the tower 18 of the main frame section 11 and the side members 23-24 of the furrowing disk frame section 12. The support members 66 are attached to the tower 18 and to the side members using ball joints 67. As illustrated by line 68, the ball joints in the tower 18 align with the top connection point 69 of the rear linkages 22. As illustrated by line 70, the ball joints at the side members 23-24 generally align with the bottom connection point 71 of the rear linkages 22. Thus, for each support member 66, a triangle is formed by the support member 66 extending from the bottom connection point 71 of the rear linkage 22 to the ball joint 67 on the tower, a line between the ball joint 67 on the tower 18 and the top connection point 69 of the rear linkage 22, and the rear linkage 22 itself. This triangle is in a plane that rotates with the rear linkage when the furrowing disk frame section 12 is raised or lowered. Because of this placement, the support members 66 can be a fixed length structure that enhances stability of the furrowing disk frame section 12.

FIGS. 9A-9E illustrate an embodiment of a shifter assembly. A shifter assembly is used to shift or move a seed control shaft connected to seed control meters, which control an opening of a seed outlet from a seed box. Thus, the shifter assembly is used to control the flow of feed out of the seed box, allowing the seed to flow toward the seed transitions 54 and then toward the planter assemblies 29. Each seed box includes a plurality of seed outlets, each with its own seed control meter. Shifting the seed control shaft moves the seed control meters for the seed outlets.

Figure 9C:
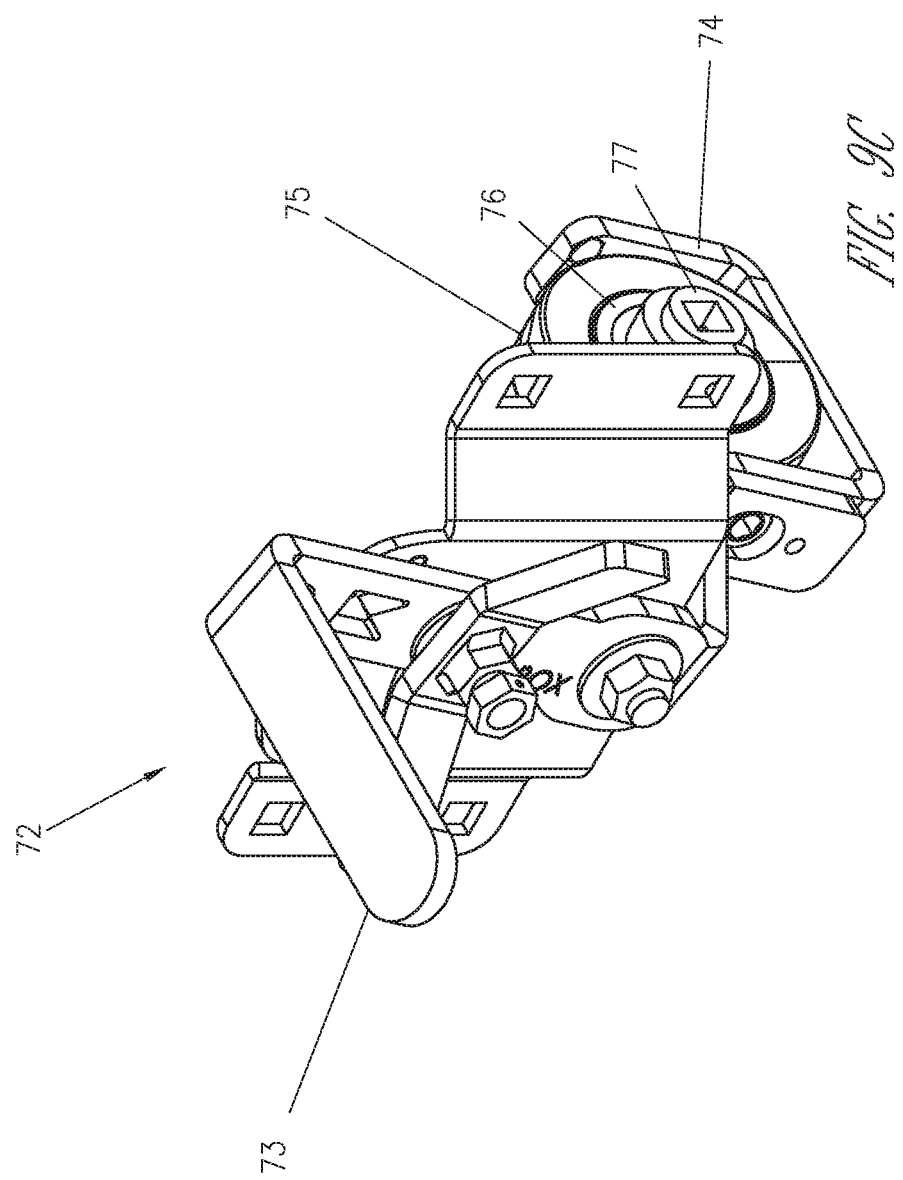
Figure 9H:
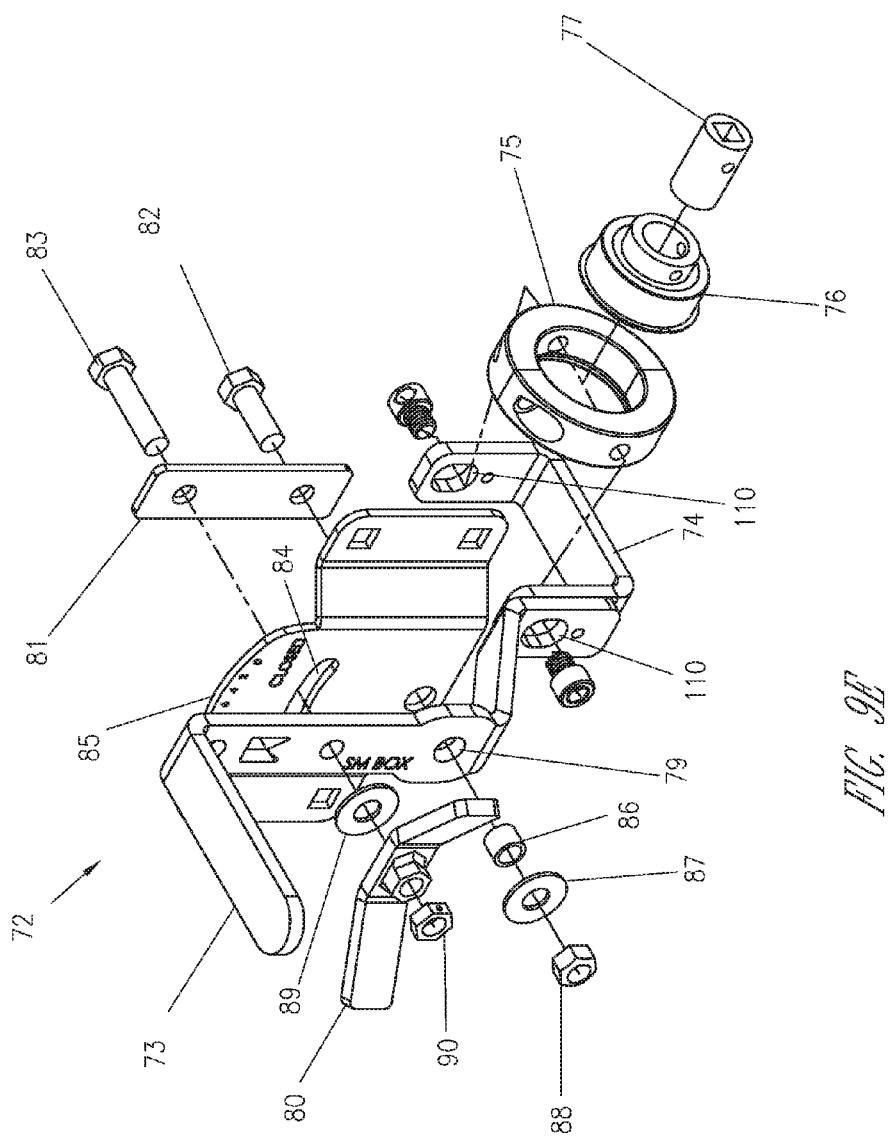

The shifter assembly 72 may be used as a small seed output control, such as may be used for the front seed box. The illustrated shifter assembly 72 includes a handle or yoke 73, and a cradle portion 74 connected to a bottom of the handle 73. The cradle portion 74 is configured to receive a shaft collar 75. The sides of the shaft collar 75 are pivotally connected to the sides of the cradle portion 74. For example, screws may be used to connect the shaft collar 75 to the cradle portion. The screws provide the shaft collar with an axis of rotation with respect to the cradle portion. The illustrated shaft collar 75 is a two piece collar configured to securely receive a snap ring bearing 76, and the snap ring bearing 76 is configured to receive square hole sleeve 77. The square hole sleeve 77 is connected to the seed control shaft. The handle 73 may include an attachment point 78 for a remote adjustment. The handle 73 turns about the handle pivot 79, and may be locked in place via a handle wing nut 80. A locking plate 81, with a first screw 82 extending through the pivot 79, and a second screw 83 extending through a slot 84 in a mount 85. The handle 73 may be connected to the mount 85 using the first screw 82, a bronze bushing 86, washer(s) 87, and a locking nut 88. The handle wing nut 80 cooperates with the second screw 83 to lock the handle by clamping down on the mount 85. A washer 89 and a locking half nut 90 may be used to connect the handle wing nut 80. The handle 73 and the cradle portion 74 have slotted openings 110 through which screws attach the shaft collar 75 to the cradle portion. These slotted openings 91 permit collar to slide with respect to the cradle portion 74 as the handle rotates from an open position (FIG. 9A, to an intermediate position FIG. 9B, to a closed position FIG. 9C) to move the seed control shaft in a linear motion. FIG. 9D illustrates the handle 73 locked in position.

Figure 10A:
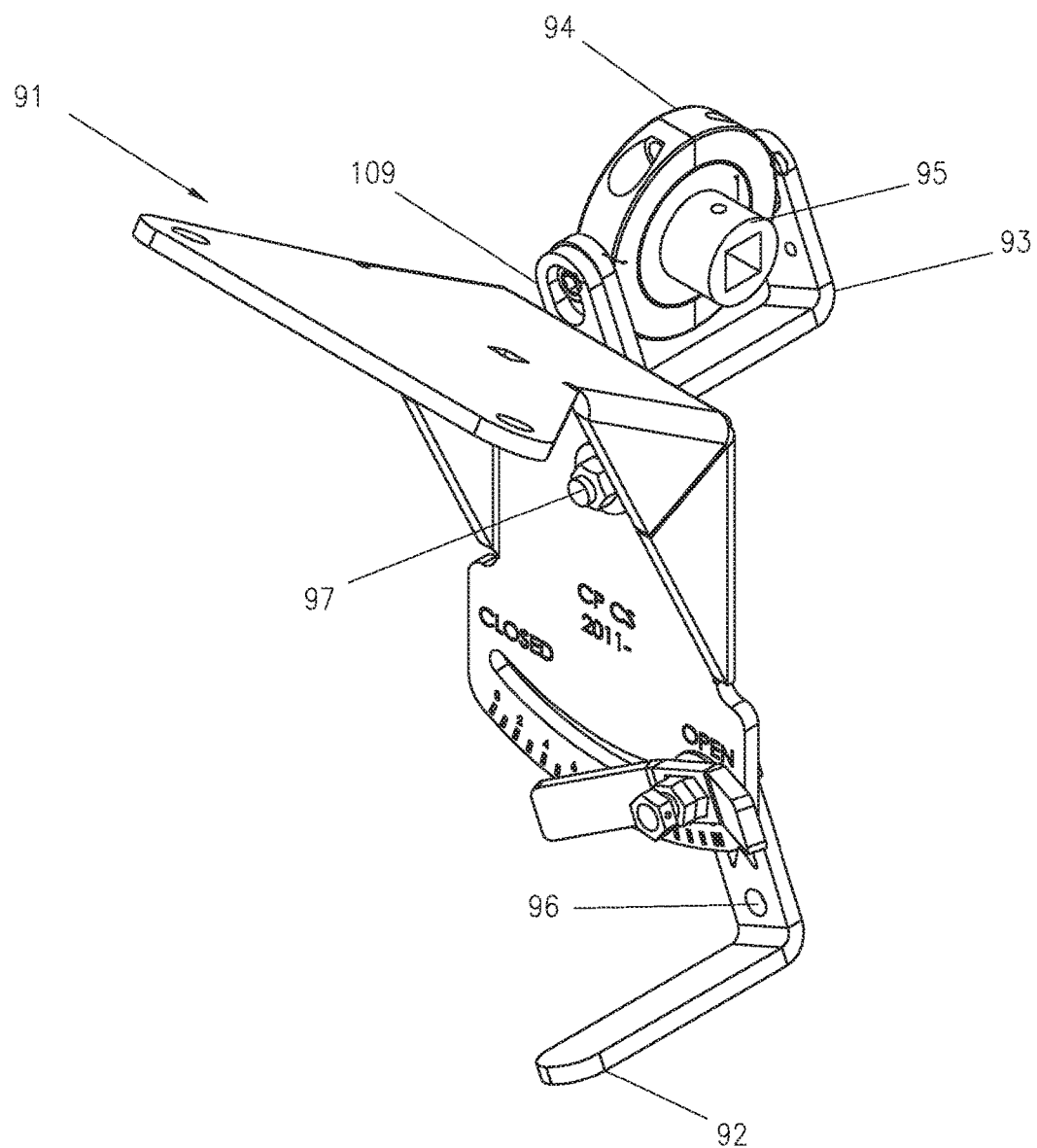
Figure 10B:
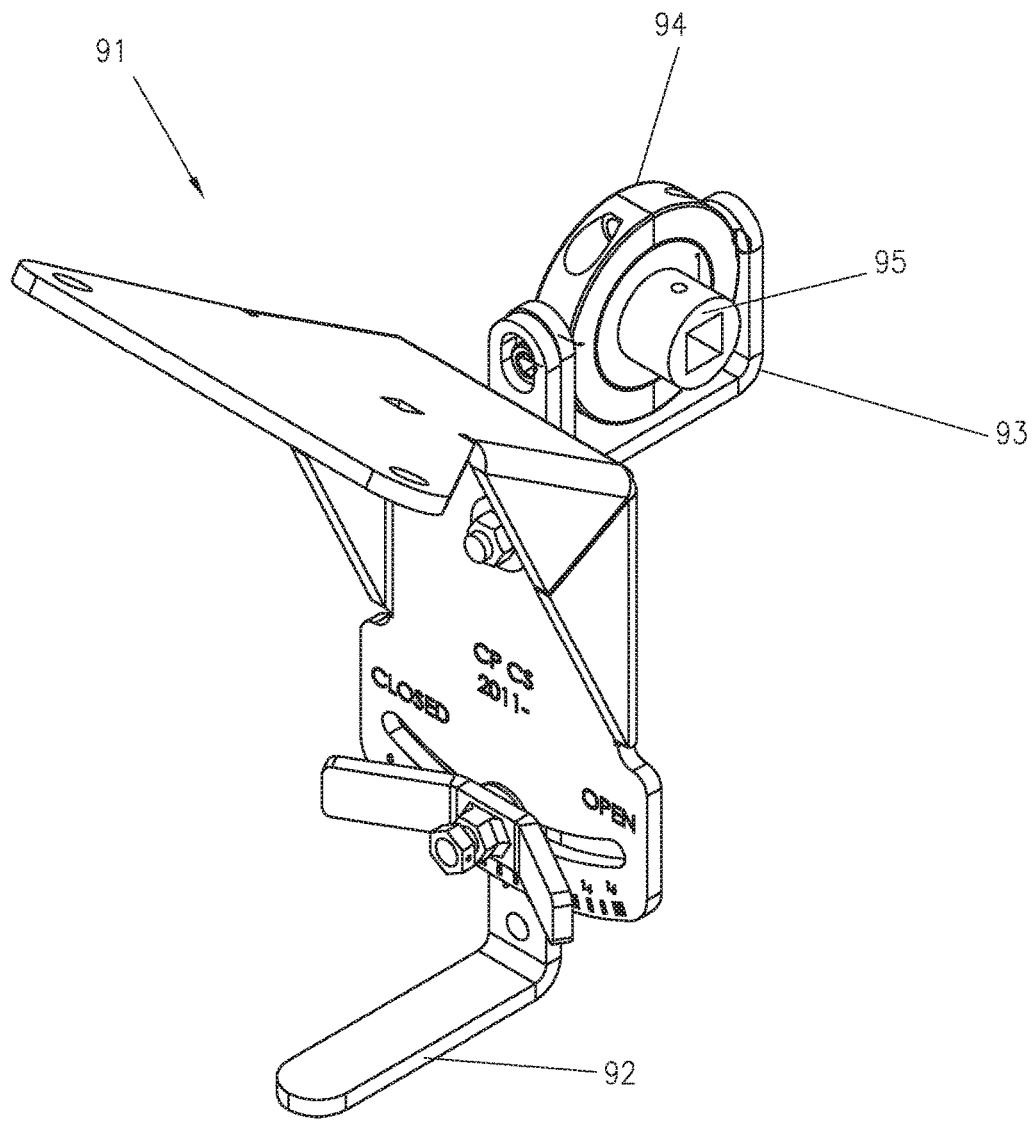
Figure 10C:
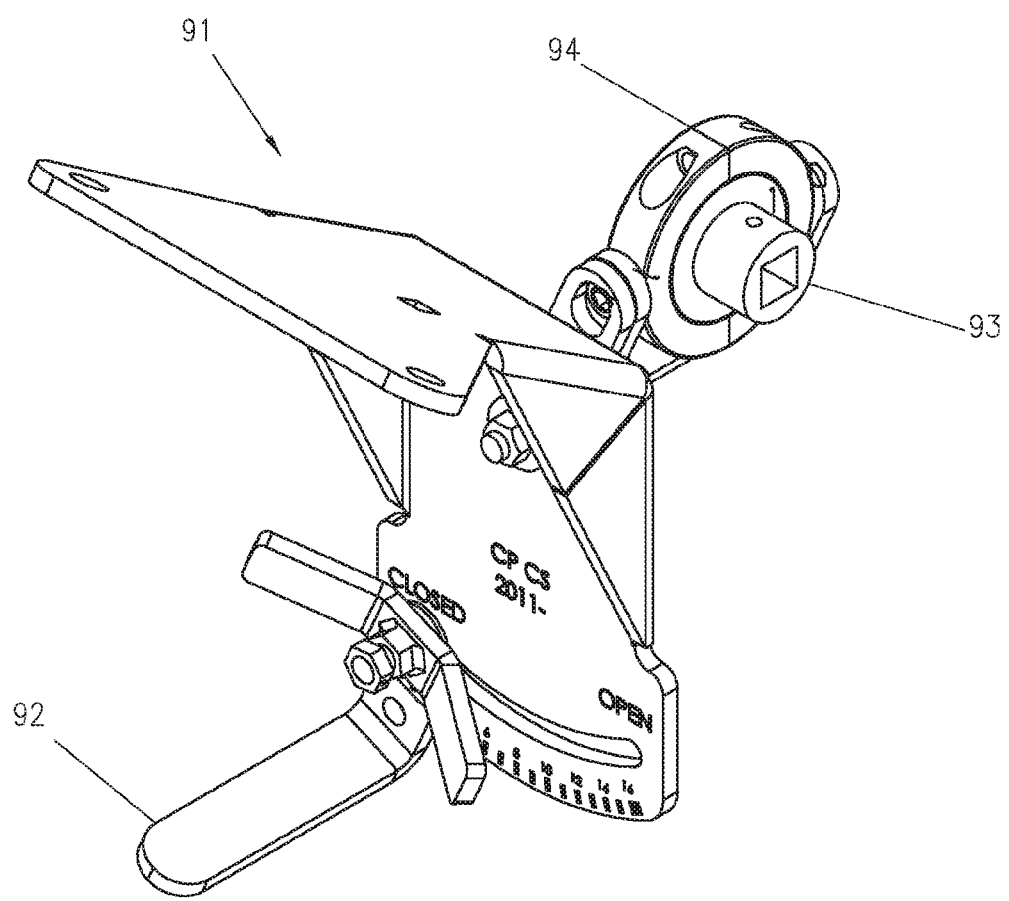
Figure 10D:
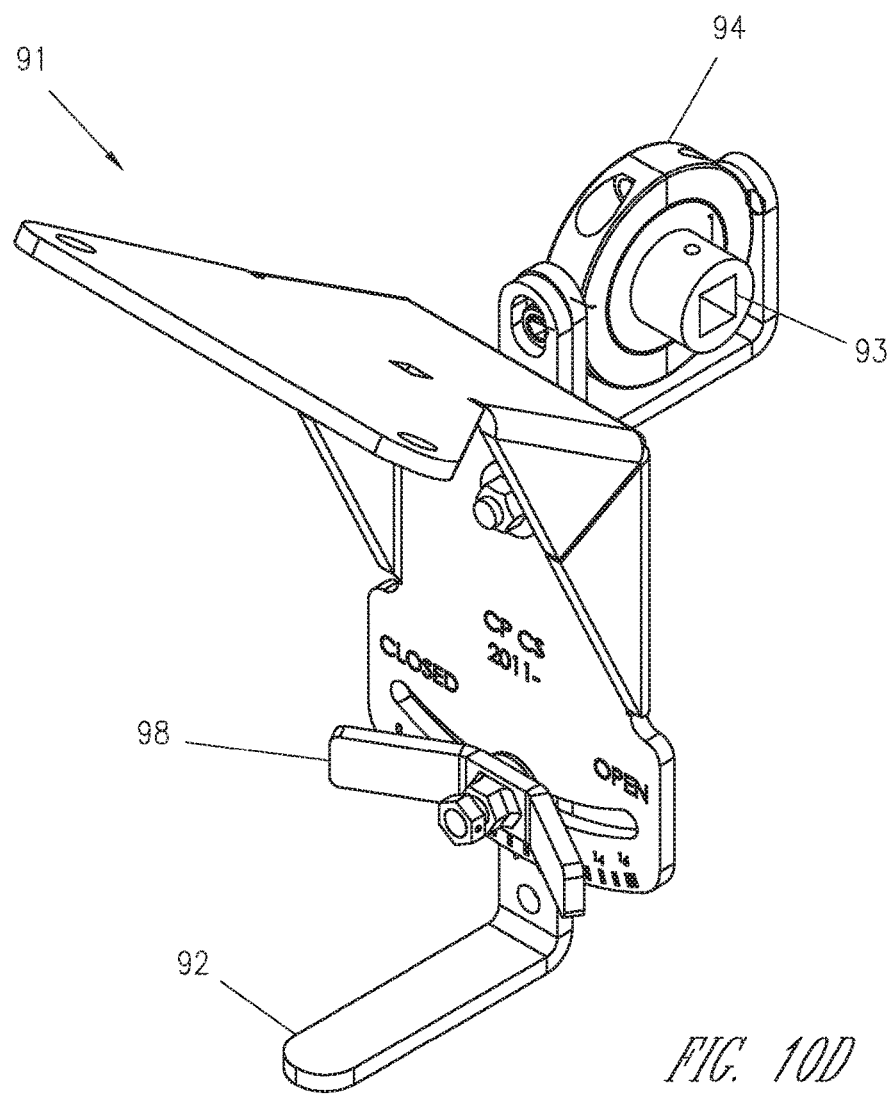

FIGS. 10A-10E illustrate an embodiment of a shifter assembly. The shifter assembly 91 may be used as a seed output control, such as may be used for small seed in the front box or grain seed in the rear box. The illustrated shifter assembly 91 includes a handle or yoke 92, and a cradle portion 93 connected to a top of the handle 92. The cradle portion 93 is configured to receive a shaft collar 94. The sides of the shaft collar 94 are pivotally connected to the sides of the cradle portion 93. For example, screws may be used to connect the shaft collar 94 to the cradle portion. The screws provide the shaft collar with an axis of rotation with respect to the cradle portion. The illustrated shaft collar 94 is a two piece collar configured to securely receive a square hole bearing 95 that is connected to the seed control shaft. The handle 92 may include an attachment point 96 for a remote adjustment. The handle 92 turns about the handle pivot 97, and may be locked in place via a handle wing nut 98. A first screw 100 extends through the pivot 97, and a second screw 101 extends through a slot 102 in a mount 103. The handle 92 may be connected to the mount 103 using the first screw 100, a bronze bushing 104, washer(s) 105, and a locking nut 106. The handle wing nut 98 cooperates with the second screw 101 to lock the handle by clamping down on the mount 103. A washer 107 and a locking half nut 108 may be used to connect the handle wing nut 98. The handle 92 and the cradle portion 93 have slotted openings 109 through which screws attach the shaft collar 94 to the cradle portion. These slotted openings 109 permit the shaft collar 94 to slide with respect to the cradle portion 93 as the handle rotates from an open position (FIG. 10A, to an intermediate position FIG. 10B, to a closed position FIG. 10C) to move the seed control shaft in a linear motion. FIG. 10D illustrates the handle 92 locked in position.

Figure 12:
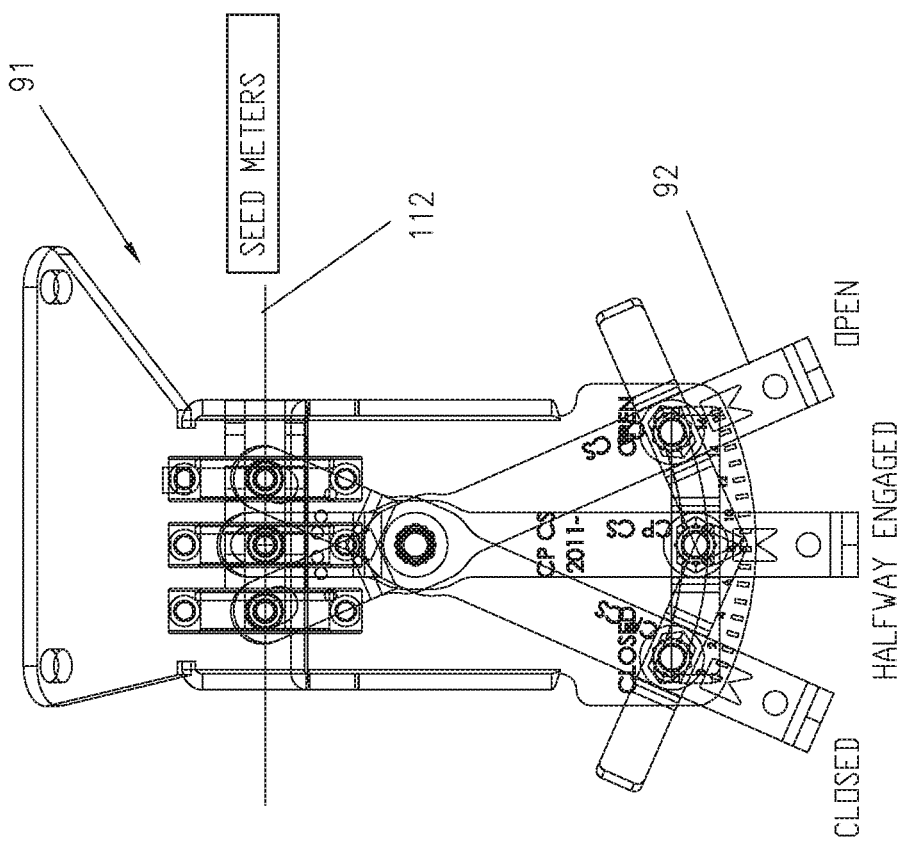
FIGS. 11-12 illustrate slotted openings for the shifter assembly of FIGS. 9A-9E and the slotted openings for the shifter assembly of FIGS. 10A-10E.
Figure 11:
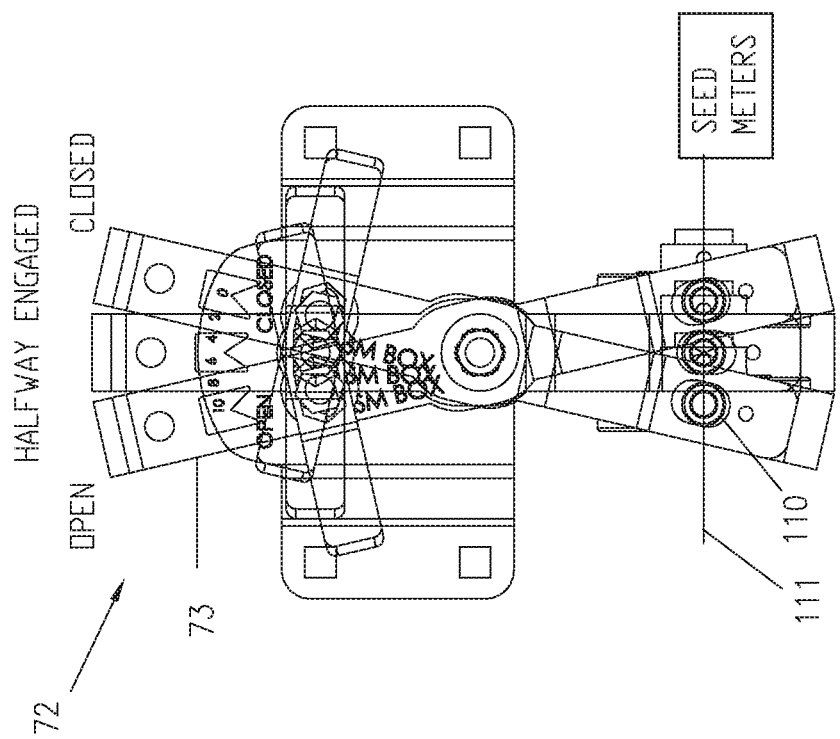

FIGS. 11 and 12 illustrate the slotted openings 110 for the shifter assembly 72 of FIGS. 9A-9E and the slotted openings 109 for the shifter assembly 91 of FIGS. 10A-10E. The shaft linearly moves along lines 111 and 112, respectfully. The slotted openings 110 for the shifter assembly 72 allow the arcuate motion of the handle 73 to be translated into linear motion along line 111; and the slotted opening 109 for the shifter assembly 91 allow the arcuate motion of the handle 92 to be translated into linear motion along line 112. Additionally, the pivoting attachment of the shaft collar 94 to the cradle portion allow the square hole bearing to remain aligned with the shaft. Thus, the shifter assemblies do not cause a deflection in the shaft, which makes it easier to move the shaft between the open and close positions.

The above detailed description is intended to be illustrative, and not restrictive. Other embodiments will be apparent to those of skill in the art upon reading and understanding the above description. The scope of the invention should, therefore, be determined with reference to the appended claims, along with the full scope of equivalents to which such claims are entitled.

What is claimed is:

1. A seed planter, comprising:
    a frame;
    a rock shaft horizontally traversing the frame;
    a compliance bar horizontally traversing the frame;
    a plurality of torsion joints operably positioned about the rock shaft;
    a plurality of planter assemblies, each planter assembly connected, via a yoke, to one of the torsion joints; and
    at least one motor configured to rotate the rock shaft to position the planter assemblies in a raised position with their yokes in contact with the compliance bar for transport and to rotate the rock shaft to position the planter assemblies in a lowered position for a planting operation.

2. The seed planter of claim 1, wherein:
    the compliance bar is a first compliance bar, the seed planter further comprising a second compliance bar horizontally traversing the frame;
    the rock shaft is a first rock shaft, the seed planter further comprising a second rock shaft horizontally traversing the frame,
    the plurality of planter assemblies includes a first rank of planter assemblies connected to the first rock shaft, and a second rank of planter assemblies connected to the second rock shaft; and
    the at least one motor is configured to rotate the first and second rock shafts to position the first rank of planter assemblies in the raised position with their yokes in contact with the compliance bar for transport and to position the second rank of planter assemblies in the raised position with their yokes in contact with the second compliance bar for transport.

3. The seed planter of claim 1, wherein the compliance bar is configured to contact yokes of the planter assemblies to prevent side-to-side motion and up-and-down motion of the plurality of planter assemblies during transport.

4. The seed planter of claim 1, wherein:
    the rock shaft includes a first rock shaft, the seed planter including a second rock shaft horizontally traversing the frame;
    the compliance bar includes a first compliance bar, the seed planter including a second compliance bar horizontally traversing the frame;
    the plurality of torsion joints includes a first set of torsion joints operably positioned about the first shaft and a second set of torsion joints operably positioned about the second shaft; and
    the plurality of planter assemblies includes a first rank of planter assemblies and a second rank of planter assemblies, each planter assembly in the first rank of planter assemblies being connected, via a yoke, to a respective one of the first set of torsion joints, and each planter assembly in the second rank of planter assemblies being connected, via a yoke, to a respective one of the second set of torsion joints.

5. The seed planter of claim 1, wherein the rock shaft has a generally square cross-section with corners and flat sides between the corners, and the torsion joint includes a generally square housing with corners and flat sides between the corners through which the rock shaft is positioned, wherein the housing is generally diagonally oriented with respect to the rock shaft in a neutral position such that the corners of the rock shaft are proximate to sides of the housing.

6. The seed planter of claim 5, further comprising a torsion spring between each side of the rock shaft and a respective interior corner of the housing.

7. The seed planter of claim 6, wherein the torsion spring generally spans the width of the housing.

8. The seed planter of claim 6, wherein the torsion spring includes a flexible elastomer type material.

9. The seed planter of claim 8, wherein the flexible elastomer type material includes a material selected from the group of materials consisting of: urethane, neoprene, and butyl.

10. The seed planter of claim 6, wherein rotation of one of the torsion joints from the neutral position causes the torsion springs within the torsion joint to deflect and induce a force to return the torsion joint to the neutral position.

11. The seed planter of claim 1, wherein each of the plurality of torsion joints is configured to provide stroke control for the respective planter assembly to which the torsion joint is connected, wherein the stroke control permits the planter assembly to follow ground irregularities by limited individual rotational motion about the rock shaft.

12. The seed planter of claim 11, further comprising a stop plate configured to rotate with the joint housing, the stop plate including an edge profile defining an open jaw that at least partially encompasses the rock shaft, wherein the jaw opening is configured to limit the individual rotational motion about the rock shaft.

13. The seed planter of claim 12, wherein the edge profile configured to provide a symmetrical or generally symmetrical open jaw to receive the rock shaft.

14. The seed planter of claim 12, wherein the stop plate includes:

a first set of surfaces configured to engage the rock shaft to provide a first limit for rotational motion of the stop plate in a first direction with respect to the rock shaft;

a second set of surface configured to engage the rock shaft to provide a second limit for rotational motion of the stop plate in a second direction with respect to the rock shaft, wherein the neutral position of the torsion joint is between the first and second limits to allow generally equal but opposite rotational motion in both the first and second rotational directions up to the first and second limits.

15. The seed planter of claim 14, wherein the first set of surfaces engage the rock shaft when the planter assemblies are in the raised position for transport.

16. The seed planter of claim 14, wherein neither the first set nor the second set of surfaces engage the rock shaft when the planter assemblies are in the lowered position and on relatively flat ground, the first set of surfaces engage the rock shaft to limit rotation when the planter assemblies are in the lowered position and the planter assembly passes over low ground, and the second set of surfaces engage the rock shaft to limit rotation when the planter assemblies are in the lowered position and the planter assembly passes over high ground.

17. The seed planter of claim 14, wherein the edge profile of each stop plate includes at least one dwell portion configured to permit rotation of the stop plate without contact with the rock shaft.

18. The seed planter of claim 14, wherein the edge profile of each stop plate provides first and second open-space lobes, the edge profile for each open space lobe including a first region and a second region, wherein the first set of surfaces includes the first region and the second set of surfaces includes the second region.

19. The seed planter of claim 18, wherein the edge profile for each open space lobe includes a dwell portion between the first and second regions, the dwell portion being configured to permit rotation of the stop plate without contact with the rock shaft.

20. The seed planter of claim 1, further comprising:
a seed box on the frame, the seed box including a plurality of seed openings;
a plurality of seed meters, each seed meter configured to control one of the seed openings;
a seed shaft configured to be linearly shifted to control the plurality of seed meters between open and closed positions;
a shifter assembly configured to linearly shift the seed shaft to control the seed meters, where the shifter assembly includes:
a handle;
a cradle portion attached to the handle;
a bearing structure configured to receive the seed shaft; and
a shaft collar configured to receive the bearing structure and pivotally connected to opposing sides of the cradle portion, wherein the cradle portion includes slotted openings in the opposing sides to permit translational motion of the shaft collar with respect to the cradle portion.

* * * * *